(12) United States Patent
Takahashi et al.

(10) Patent No.: US 8,665,042 B2
(45) Date of Patent: Mar. 4, 2014

(54) WIRELESS SWITCH WITH MULTIPOLAR ELECTROMAGNETIC GENERATOR

(71) Applicant: EcoHarvester, Inc., Berkeley, CA (US)

(72) Inventors: Eri Takahashi, Berkeley, CA (US); Shadrach Joseph Roundy, Concord, CA (US); Jeffry Tola, Upland, CA (US); Brian L. Bircumshaw, Newtonville, MA (US); Stewart Carl, Palo Alto, CA (US)

(73) Assignee: EcoHarvester, Inc., Berkeley, CA (US)

( * ) Notice: Subject to any disclaimer, the term of this patent is extended or adjusted under 35 U.S.C. 154(b) by 0 days.

(21) Appl. No.: 13/659,097

(22) Filed: Oct. 24, 2012

(65) Prior Publication Data
US 2013/0113306 A1 May 9, 2013

Related U.S. Application Data

(63) Continuation of application No. 12/855,848, filed on Aug. 13, 2010, now Pat. No. 8,324,998.

(60) Provisional application No. 61/242,805, filed on Sep. 16, 2009, provisional application No. 61/315,021, filed on Mar. 18, 2010.

(51) Int. Cl.
*H01H 9/00* (2006.01)

(52) U.S. Cl.
USPC .......................................................... 335/207

(58) Field of Classification Search
USPC .............................................. 310/15; 335/207
See application file for complete search history.

(56) References Cited

U.S. PATENT DOCUMENTS

| | | | | |
|---|---|---|---|---|
| 4,187,453 A * | 2/1980 | Rough | | 318/135 |
| 5,808,381 A * | 9/1998 | Aoyama et al. | | 310/12.29 |
| 6,664,664 B2 * | 12/2003 | Botos et al. | | 310/12.25 |
| 7,142,075 B1 * | 11/2006 | Roesler et al. | | 335/78 |
| 7,535,148 B2 * | 5/2009 | Harris et al. | | 310/156.56 |
| 8,193,781 B2 * | 6/2012 | Lin et al. | | 322/3 |
| 2001/0035686 A1 * | 11/2001 | Hwang et al. | | 310/12 |
| 2002/0185919 A1 * | 12/2002 | Botos et al. | | 310/12 |
| 2005/0146296 A1 * | 7/2005 | Klemm et al. | | 318/119 |
| 2005/0275294 A1 * | 12/2005 | Izumi et al. | | 310/15 |
| 2007/0007827 A1 * | 1/2007 | Harris et al. | | 310/15 |
| 2007/0159011 A1 * | 7/2007 | Terzian et al. | | 310/15 |
| 2007/0296369 A1 | 12/2007 | Yeh | | |
| 2008/0074083 A1 * | 3/2008 | Yarger et al. | | 320/137 |

* cited by examiner

*Primary Examiner* — Alexander Talpalatski
(74) *Attorney, Agent, or Firm* — Van Pelt, Yi & James LLP

(57) ABSTRACT

A wireless switch comprises a mechanical oscillator, a mechanical impulse deliverer, a first array of magnets positioned on a planar surface, a first conductor, and a power management circuit. The mechanical impulse deliverer delivers a mechanical impulse to the mechanical oscillator when the wireless switch is switched. The first array comprises a one dimensional or two dimensional array of magnets. The first conductor comprises a first serpentine conductor. The power management circuit provides DC power as a result of relative motion due to the mechanical oscillator between the first array of magnets and the first conductor.

24 Claims, 20 Drawing Sheets

WIRELESS SWITCH WITH MULTIPOLAR ELECTROMAGNETIC GENERATOR

CROSS REFERENCE TO OTHER APPLICATIONS

This application is a continuation of co-pending U.S. patent application Ser. No. 12/855,848, entitled WIRELESS SWITCH WITH MULTIPOLAR ELECTROMAGNETIC GENERATOR filed Aug. 13, 2010 which is incorporated herein by reference for all purposes, which claims priority to U.S. Provisional Patent Application No. 61/242,805 entitled MULTIPOLAR ELECTROMAGNETIC GENERATOR filed Sep. 16, 2009 which is incorporated herein by reference for all purposes.

This application is a continuation of co-pending U.S. patent application Ser. No. 12/855,848, entitled WIRELESS SWITCH WITH MULTIPOLAR ELECTROMAGNETIC GENERATOR filed Aug. 13, 2010 which is incorporated herein by reference for all purposes, which claims priority to U.S. Provisional Patent Application No. 61/315,021 entitled MULTIPOLAR ELECTROMAGNETIC GENERATOR FOR A SWITCH filed Mar. 18, 2010 which is incorporated herein by reference for all purposes.

BACKGROUND OF THE INVENTION

There are many sensor application areas where there is a clear need for innovative power solutions. The market for wireless sensor networks in industrial automation, supply chain management, construction, home automation, asset tracking and environmental monitoring is expected to grow to well over 400 million devices by 2012. The average useful life of such a system is targeted to be more than 10 years, which means that the stand-alone usage of conventional batteries poses significant barriers to being a robust energy solution.

Harvesting energy from motion has been the focus of intense research. There are three common technological approaches: piezoelectric, electrostatic, and electromagnetic. Numerous research groups and companies have tried to develop miniature thin-film piezoelectric devices to harness vibrations in the last 20 years. However, one problem is that thin-film piezoelectric energy have limited power output because of their high-voltage low-current output, typically tens of volts and less than nanoamperes, which makes it difficult to convert without substantial losses. Another problem is the high intrinsic frequencies of piezoelectric (PZT) materials, typically around MHz, that can't be coupled to any vibrations or cyclical motion available for practical applications.

Other groups have focused on developing electrostatic generators. Electrostatic generators have limited power output similar to piezoelectric generators also due to the fact that they produce only high voltages and low electrical currents. Furthermore, it can be shown that in most cases electrostatic generators have lower power densities than either piezoelectric or electromagnetic generators due to the relatively low energy density of an electrostatic air gap on which the electrostatic generators rely.

On the other hand, electromagnetic power generators have the potential to supply relatively large amounts of power without being restricted to the intrinsic frequencies of piezoelectric materials. However, generating sufficient power at a desired compact scale has still not been achieved. Further, the unmatched natural frequency of a small scale device, typically kHz, cannot be coupled to the vibrations that are commonly available for most applications. Lastly, current designs require state-of-the-art precision machining and assembly (e.g., e laser cutting, electrical discharge machining (EDM), and CNC machining) or micromachining and thin film technologies (e.g., Magnetic materials, both permanent magnets and magnetic alloys, are difficult and expensive to do as thinfilms. Micromachining in general gets expensive as the size of the device gets larger, and in this case the devices need to be relatively large (~1 cm^2) to give any reasonable amount of power. At that size, micromachining becomes quite expensive.) that drastically raise manufacturing costs beyond that of batteries.

BRIEF DESCRIPTION OF THE DRAWINGS

Various embodiments of the invention are disclosed in the following detailed description and the accompanying drawings.

DETAILED DESCRIPTION

Figure 1A:
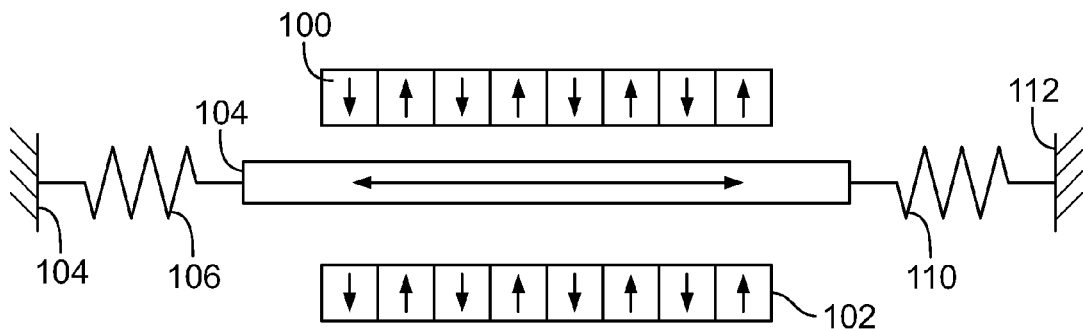
FIG. 1A is a block diagram illustrating an embodiment of a portion of a power generator.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self powered switch with wireless interconnection is disclosed. The wireless switch comprises a mechanical oscillator, a mechanical impulse deliverer, an array of magnets, a conductor, a power management circuit, and a power management circuit. The mechanical impulse deliverer delivers a mechanical impulse to the mechanical oscillator when the wireless switch is switched. The array comprises a one dimensional or two dimensional array of magnets positioned on a planar surface. The conductor comprises a serpentine conductor. The power management circuit provides DC power as a result of relative motion due to the mechanical oscillator between the array of magnets and the conductor.

In some embodiments, the power generated by the motion associated with switching the switch is used to transmit the information that the switch has been switched. The DC power generated powers a transmitter that transmits the information of the state change of the switch to a receiver. In some embodiments, the wireless switch includes a processor that is used to track the state of the switch (e.g., using a sensor or an electrical signal indicating a state of the switch) and to indicate one or more states (e.g., a dial or rotary switch or a dimmer slide switch, etc.). In some embodiments, the wireless switch includes a memory coupled to the processor to store state information or state transition rules or other instructions for the processor. In some embodiments, the processor is coupled to a receiver that can receive state information or other instructions as transmitted from a transmitter. In some embodiments, the wireless switch receiver and/or processor are powered using a battery that is charged by the motion of the switch.

A wireless switch is disclosed. The wireless switch comprises a mechanical oscillator, a mechanical impulse deliverer, a multipole magnet, a set of coils, and a power management circuit. The mechanical impulse deliverer delivers a mechanical impulse when the wireless switch is switched to the mechanical oscillator. There is relative motion due to the mechanical oscillator between the set of coils and the multipole magnet. The power management circuit uses a current generated by having relative motion between the set of coils and the mulitpole magnet to generate power for transmitting a wireless signal indicating that the wireless switch has been switched.

In some embodiments, suspension springs that are preloaded are advantageous. A preloaded generator works as follows. The suspension springs are initially held in a preloaded position by some ratcheting or friction mechanism. When a user actuates the device (e.g., a wireless switch), the ratcheting mechanism pushes a proof mass and springs slightly further in the direction of the preload and then releases the mechanism. A ratcheting wheel rotates counter clockwise to complete this action. The wheel, however, cannot rotate in the clockwise direction. Once released, the proof mass oscillates to the far side and back, catching the ratcheting mechanism on the return. Thus, the system remains in preload for the next actuation. Depending on timing, the proof mass may oscillate more than once before catching the ratcheting mechanism, but it cannot oscillate so long that its amplitude is too low to re-engage the ratcheting mechanism.

In some embodiments, a proof mass is caught by a latch. The latch is released when a user pulls or pushes on the device. The latch is released when latch makes contact after moving due to the displacement of the proof mass as a result of the user pull or push.

There are two advantages of this type of design for a power generator: 1) The maximum voltage is proportional to maximum velocity, and by preloading the springs, the maximum velocity in increased in this design; and 2) All of the energy collection happens very quickly, in the first oscillation or first few oscillations—thus, the maximum power is higher, although the total energy generation is not. Compressing the energy generation into a shorter time interval can be advantageous for some applications.

In some embodiments the mechanical impulse deliverer is actuated by a button, a lever, a rotary dial, a toggle switch, etc. The impulse deliverer displaces a proof mass a given distance and then release the proof mass while leaving space for the proof mass to oscillate without interference.

In some embodiments, the conductor is implemented by means of a multilayer circuit board. In various embodiments, the conductor comprises a serpentine conductor, a set of coils, multiple layers of conductor, multiple structures corresponding to multiple poles, or any other appropriate conductor.

In some embodiments, a wireless switch comprises a power generator. In some embodiments, the power generator comprises an array of magnets positioned on a planar surface, a conductor, and a power management circuit. The array comprises a one dimensional or two dimensional array of magnets. The conductor comprises a serpentine conductor that is on a plurality of layers of a multilayer printed circuit board. The power management circuit generates DC power as a result of relative motion between the array of magnets and the conductor.

In some embodiments, a wireless switch comprises a power generator. In some embodiments, the power generator comprises a sheet magnet, a conductor, and a power management circuit. The sheet magnet includes a one dimensional or two dimensional array of alternating magnetic poles. The conductor comprises a serpentine conductor that is on more than a single plane. The power management circuit generates DC power as a result of relative motion between the sheet magnet and the conductor.

In some embodiments, a wireless switch comprises a power generator. In some embodiment, the power generator comprises a mutlipole magnet, a set of coils, and a power management circuit. The multipole magnet and the coils oscillate relative to each other. A voltage and/or current is/are generated by the relative motion between the multipole magnet and set of coils. A power management circuit conditions the power generated for use by standard electronics or electrical systems.

In some embodiments, the conductor or set of coils is implemented as a multilayer circuit board. If the circuit board is fixed, or stationary, the magnet is attached to a flexure that allows it to oscillate with respect to the conductor. If the magnet is fixed, the circuit board (or other embodiment of the coils or conductor(s)) is securely attached to a flexure that allows it to oscillate with respect to the magnet.

In some embodiments, a multilayer circuit board has a conductor on the surfaces of the multiple layers of a multilayer circuit board that present an area to the magnetic field of a multipole magnet. The multilayer circuit board is moved (e.g., oscillated) relative to the multipole magnet, or alternatively the magnet is moved relative to the circuit board. The conductor of the multilayer circuit board experiences a change in magnetic flux enclosed by the conductor due to the relative motion between the multilayer circuit board and the multipole magnet leading to a voltage and/or current generated across the planar coil created by the conductor. In some embodiments, a power management circuit conditions the power by converting an alternating voltage (e.g., due to the oscillation) to DC voltage by using rectification (e.g., a diode circuit) and storing the energy on a capacitor and/or a battery or providing the power directly to an electrical load or circuit that uses the power.

FIG. 1A is a block diagram illustrating an embodiment of a portion of a power generator. In the example shown, multipole magnet 100 and multipole magnet 102 each comprise a series of magnets with a cycle of adjacent north-south and then south-north oriented magnets. In some embodiments, multipole magnet 100 and/or multipole magnet 102 comprise(s) a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 100 or multipole magnet 102) presenting a field to multilayer circuit board.

Multipole magnet 100 and multipole magnet 102 each presents a magnetic field to multilayer circuit board 104. Multipole magnet 100 and multipole magnet 102 are on opposite sides of multilayer circuit board 104. Multipole magnet 100 and multipole magnet 102 are aligned such that the stripes of north of one magnet line up with the stripes of south of the other magnet. Multilayer circuit board 104 experiences a higher magnetic field because of the two magnets (multipole magnet 100 and multipole magnet 102). Multilayer circuit board 104 moves relative to multipole magnet 100 and multipole magnet 102. Multilayer circuit board 104 is oscillated using suspension 106 and suspension 110. Suspension 106 suspends multilayer circuit board 104 from fixed structure 108. Suspension 110 suspends multilayer circuit board 104 from fixed structure 112. Suspension 106 and suspension 110 are selected such that the oscillation frequency of the suspended multilayer circuit board 104 is tailored for the motion experienced by the power generator. In various embodiments, the tailoring is achieved by selecting the size, material, mass (e.g., adding mass), or any other appropriate characteristic of multilayer circuit board 104 and/or suspension 106 and/or suspension 110. In some embodiments, weight is added to multilayer circuit board 104. In some embodiments, suspension 106 and/or suspension 110 are made using low cost stamping and cutting. In some embodiments, suspension 106 and/or suspension 110 are made of plastic. In some embodiments, suspension 106 and/or suspension 110 is/are part of a suspension sheet, where the suspension sheet is coupled to multilayer circuit board 104.

In some embodiments, multilayer circuit board 104 is approximately 5.5 cm wide, 5.5 cm tall, and 1 mm thick. Multilayer circuit board 104 weighs 10 g and is suspended by using a stamped metal suspension 106 and suspension 110 with a resonant frequency of approximately 160 Hz.

In some embodiments, multilayer circuit board 104 is approximately 3.5 cm wide, 4 cm tall, and 1 mm thick. Multilayer circuit board 104 weighs 4 g and is suspended by using a metal suspension 106 and metal suspension 110 with a resonant frequency of approximately 80 Hz.

Figure 1B:
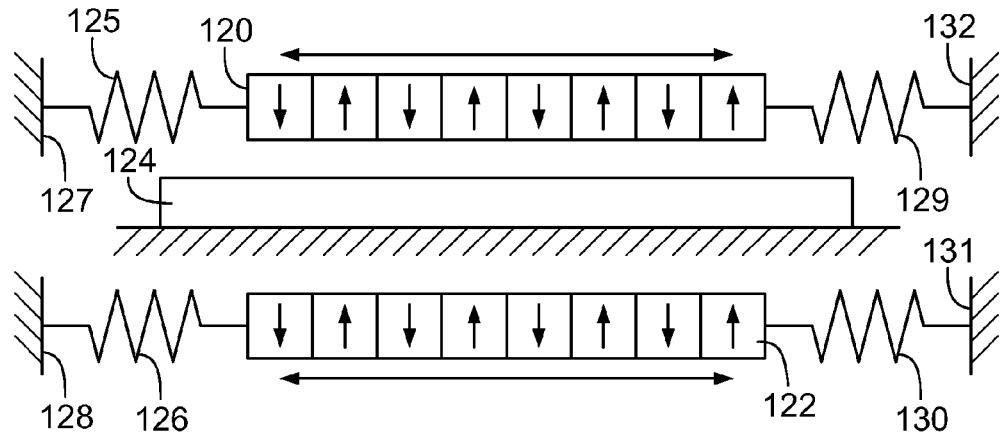
FIG. 1B is a block diagram illustrating an embodiment of a portion of a power generator.

FIG. 1B is a block diagram illustrating an embodiment of a portion of a power generator. In the example shown, multipole magnet 120 and multipole magnet 122 each comprise a series of magnets with a cycle of adjacent north-south and then south-north oriented magnets. In some embodiments, multipole magnet 120 and/or multipole magnet 122 comprise(s) a sheet magnet (e.g., NdFeB rubber sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 120 or multipole magnet 122) presenting a field to multilayer circuit board.

Multipole magnet 120 and multipole magnet 122 each presents a magnetic field to multilayer circuit board 124.

Multipole magnet 120 and multipole magnet 122 are on opposite sides of multilayer circuit board 124. Multipole magnet 120 and multipole magnet 122 are aligned such that the stripes of north of one magnet line up with the stripes of south of the other magnet. Multilayer circuit board 104 experiences a higher magnetic field because of the two magnets (multipole magnet 120 and multipole magnet 122). Multilayer circuit board 124 moves relative to multipole magnet 120 and multipole magnet 122. Multipole magnet 120 is oscillated using suspension 125 and suspension 129. Suspension 125 suspends multipole magnet 120 from fixed structure 127. Suspension 129 suspends multipole magnet 120 from fixed structure 132. Suspension 126 suspends multipole magnet 122 from fixed structure 128. Suspension 130 suspends multipole magnet 122 from fixed structure 131. Suspension 125, suspension 126, suspension 129, and suspension 130 are selected such that the oscillation frequency of the suspended multipole magnet 120 and multipole magnet 122 is/are tailored for the motion experienced by the power generator. In various embodiments, the tailoring is achieved by selecting the size, material, mass (e.g., adding mass), or any other appropriate characteristic of multipole magnet 120 and/or multipole magnet 122 and/or suspension 125, suspension 126, suspension 129, and/or suspension 130. In some embodiments, weight is added to multilayer circuit board 124. In some embodiments, suspension 125, suspension 126, suspension 129, and/or suspension 130 are made using low cost stamping and cutting. In some embodiments, suspension 125, suspension 126, suspension 129, and/or suspension 130 are made of plastic. In some embodiments, suspension 125, suspension 126, suspension 129, and/or suspension 130. is/are part of a suspension sheet, where the suspension sheet is coupled to multipole magnet 120 or multipole magnet 122. Mutlipole magnet 120 and multipole magnet 122 are each allowed to oscillate independently.

Figure 1C:
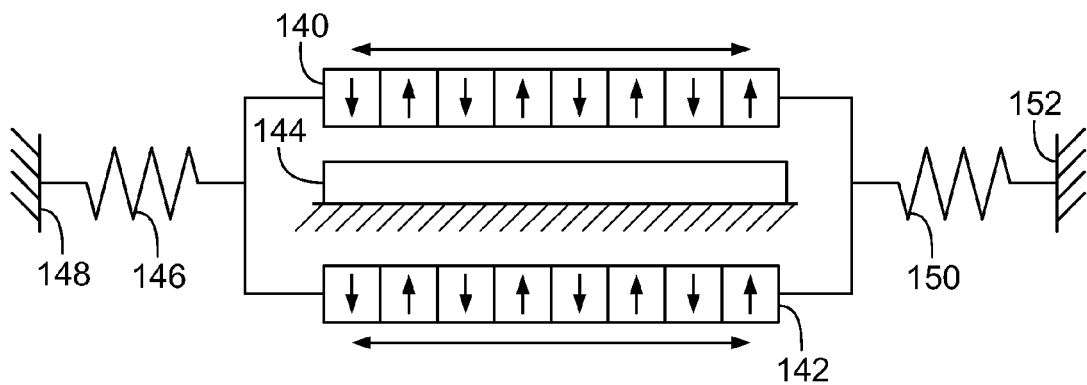
FIG. 1C is a block diagram illustrating an embodiment of a portion of a power generator.

FIG. 1C is a block diagram illustrating an embodiment of a portion of a power generator. In the example shown, multipole magnet 140 and multipole magnet 142 each comprise a series of magnets with a cycle of adjacent north-south and then south-north oriented magnets. In some embodiments, multipole magnet 140 and/or multipole magnet 142 comprise(s) a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy. In some embodiments, there is only one multipole magnet (e.g., multipole magnet 140 or multipole magnet 142) presenting a field to multilayer circuit board.

Multipole magnet 140 and multipole magnet 142 each presents a magnetic field to multilayer circuit board 144. Multipole magnet 140 and multipole magnet 142 are on opposite sides of multilayer circuit board 144. Multipole magnet 140 and multipole magnet 142 are aligned in the resting position of the suspensions such that the stripes of north of one magnet line up with the stripes of south of the other magnet. Multilayer circuit board 144 experiences a higher magnetic field because of the two magnets (multipole magnet 140 and multipole magnet 142). Multilayer circuit board 144 moves relative to multipole magnet 140 and multipole magnet 142. Multipole magnet 140 and multipole magnet 142 are oscillated using suspension 146 and suspension 150. Suspension 146 suspends multipole magnet 140 and mutlipole magnet 142 from fixed structure 148. Suspension 150 suspends multipole magnet 140 and multipole magnet 142 from fixed structure 152. Suspension 146 and suspension 150 are selected such that the oscillation frequency of the suspended multipole magnet 140 and multipole magnet 142 is/are tailored for the motion experienced by the power generator. In various embodiments, the tailoring is achieved by selecting the size, material, mass (e.g., adding mass), or any other appropriate characteristic of multipole magnet 140 and/or multipole magnet 142 and/or suspension 146 and/or suspension 150. In some embodiments, weight is added to multilayer circuit board 144. In some embodiments, suspension 146 and/or suspension 150 are made using low cost stamping and cutting. In some embodiments, suspension 146 and/or suspension 150 are made of plastic. In some embodiments, or suspension 146 and/or suspension 150 is/are part of a suspension sheet, where the suspension sheet is coupled to multipole magnet 140 or multipole magnet 142. Mutlipole magnet 140 and multipole magnet 142 are coupled so that they oscillate together.

Figure 1D:
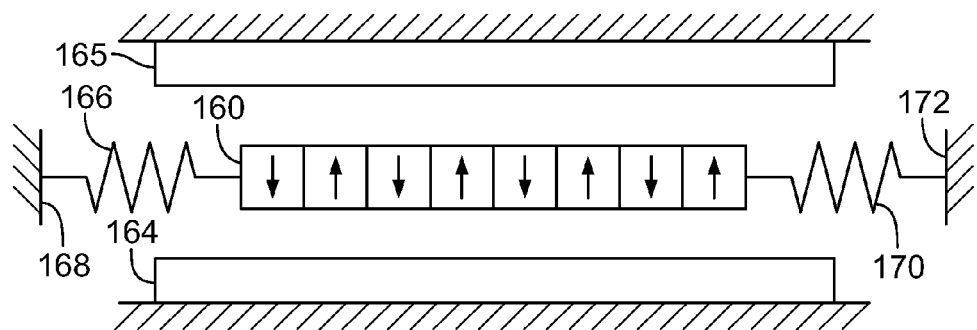
FIG. 1D is a block diagram illustrating an embodiment of a portion of a power generator.

FIG. 1D is a block diagram illustrating an embodiment of a portion of a power generator. In the example shown, multipole magnet 160 comprises a series of magnets with a cycle of adjacent north-south and then south-north oriented magnets. In some embodiments, multipole magnet 160 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 160 present a magnetic field to multilayer circuit board 164 and multilayer circuit board 165. Multilayer circuit board 164 and multilayer circuit board 165 are on opposite sides of mutlipole magnet 160. Multilayer circuit board 164 and multilayer circuit board 165 are aligned such that the stripes of north of one magnet line up with the conductor lines in the circuit boards in the resting position of the suspensions. The motion of multipole magnet 160 presents a change in magnetic flux enclosed by the areas between conductors on multilayer circuit board 164 and multilayer circuit board 165 such that a current is generated. Multipole magnet 160 is oscillated using suspension 166 and suspension 170. Suspension 166 suspends multipole magnet 160 from fixed structure 168. Suspension 170 suspends multipole magnet 160 from fixed structure 172. Suspension 166 and suspension 170 are selected such that the oscillation frequency of the suspended multipole magnet 160 is tailored for the motion experienced by the power generator. In various embodiments, the tailoring is achieved by selecting the size, material, mass (e.g., adding mass), or any other appropriate characteristic of multipole magnet 160 and/or suspension 166 and/or suspension 170. In some embodiments, weight is added to mutlipole magnet 160. In some embodiments, suspension 166 and/or suspension 170 are made using low cost stamping and cutting. In some embodiments, suspension 166 and/or suspension 170 are made of plastic. In some embodiments, or suspension 166 and/or suspension 170 is/are part of a suspension sheet, where the suspension sheet is coupled to multipole magnet 160.

In some embodiments, multipole magnet 160 is approximately 3.5 cm wide, 4 cm tall, and 1 mm thick and weighs about 4 g. Multipole magnet 160 is suspended by using a stamped metal suspension 166 and suspension 170 with a resonant frequency of approximately 80 Hz.

Figure 1E:
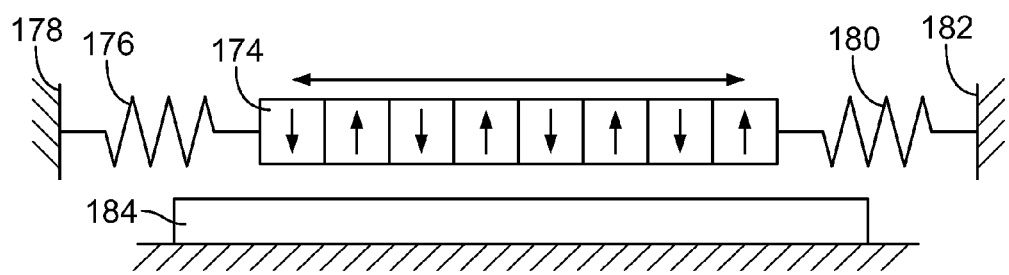
FIG. 1E is a block diagram illustrating an embodiment of a portion of a power generator.

FIG. 1E is a block diagram illustrating an embodiment of a portion of a power generator. In the example shown, multipole magnet 174 comprises a series of magnets with a cycle of adjacent north-south and then south-north oriented magnets.

In some embodiments, multipole magnet 174 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 174 present a magnetic field to multilayer circuit board 184. Multilayer circuit board 184 is aligned such that the stripes of north of one magnet line up with the conductor lines in multilayer circuit board 184 in the resting position of the suspensions. The motion of multipole magnet 174 presents a change in magnetic flux enclosed by the areas between conductors on multilayer circuit board 184 such that a voltage and/or current is generated. Multipole magnet 174 is oscillated using suspension 176 and suspension 180. Suspension 176 suspends multipole magnet 174 from fixed structure 178. Suspension 180 suspends multipole magnet 174 from fixed structure 182. Suspension 176 and suspension 180 are selected such that the oscillation frequency of the suspended multipole magnet 174 is tailored for the motion experienced by the power generator. In various embodiments, the tailoring is achieved by selecting the size, material, mass (e.g., adding mass), or any other appropriate characteristic of multipole magnet 174 and/or suspension 176 and/or suspension 180. In some embodiments, weight is added to mutlipole magnet 174. In some embodiments, suspension 176 and/or suspension 180 are made using low cost stamping and cutting. In some embodiments, suspension 176 and/or suspension 180 are made of plastic. In some embodiments, or suspension 176 and/or suspension 180 is/are part of a suspension sheet, where the suspension sheet is coupled to multipole magnet 174.

In some embodiments, multipole magnet 174 is approximately 3.5 cm wide, 4 cm tall, and 1 mm thick. Multipole magnet 174 weighs 4 g and is suspended by using a stamped metal suspension 176 and suspension 180 with a resonant frequency of approximately 80 Hz.

Figure 1F:
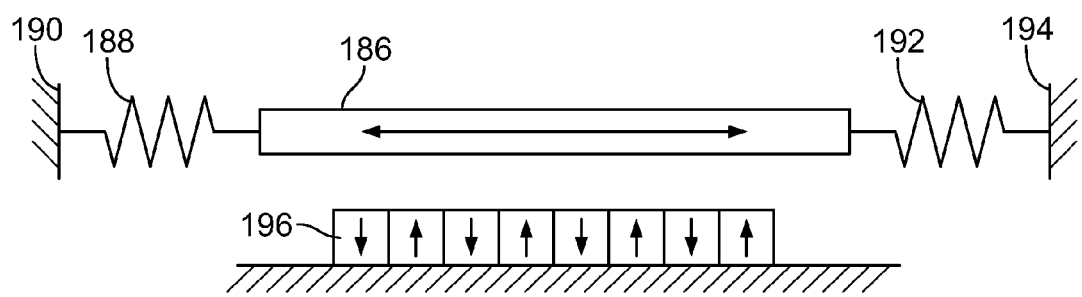
FIG. 1F is a block diagram illustrating an embodiment of a portion of a power generator.

FIG. 1F is a block diagram illustrating an embodiment of a portion of a power generator. In the example shown, multipole magnet 196 comprises a series of magnets with a cycle of adjacent north-south and then south-north oriented magnets. In some embodiments, multipole magnet 196 comprises a sheet magnet (e.g., NdFeB sheet magnet). In some embodiments, a sheet magnet has a surface magnetic field of ~150 mTesla. In various embodiments, the pitch for the magnet is a couple of millimeters, 1 millimeter, a fraction of a millimeter, or any other appropriate pitch. In some embodiments, the pitch is matched to the range of motion being harvested for energy.

Multipole magnet 196 present a magnetic field to multilayer circuit board 186. Multilayer circuit board 186 is aligned such that the stripes of north of one magnet line up with the conductor lines in multilayer circuit board 186 in the resting position of the suspensions. The motion of multilayer circuit board 186 presents a change in magnetic flux enclosed by the areas between conductors on multipole magnet 196 such that a voltage and/or current is generated. Multilayer circuit board 186 is oscillated using suspension 192 and suspension 188. Suspension 188 suspends multilayer circuit board 186 from fixed structure 190. Suspension 192 suspends multilayer circuit board 186 from fixed structure 194. Suspension 192 and suspension 188 are selected such that the oscillation frequency of the suspended multilayer circuit board 186 is tailored for the motion experienced by the power generator. In various embodiments, the tailoring is achieved by selecting the size, material, mass (e.g., adding mass), or any other appropriate characteristic of multilayer circuit board 186 and/or suspension 192 and/or suspension 188. In some embodiments, weight is added to multilayer circuit board 186. In some embodiments, suspension 192 and/or suspension 188 are made using low cost stamping and cutting. In some embodiments, suspension 192 and/or suspension 188 are made of plastic. In some embodiments, or suspension 192 and/or suspension 188 is/are part of a suspension sheet, where the suspension sheet is coupled to multilayer circuit board 186.

Figure 2A:
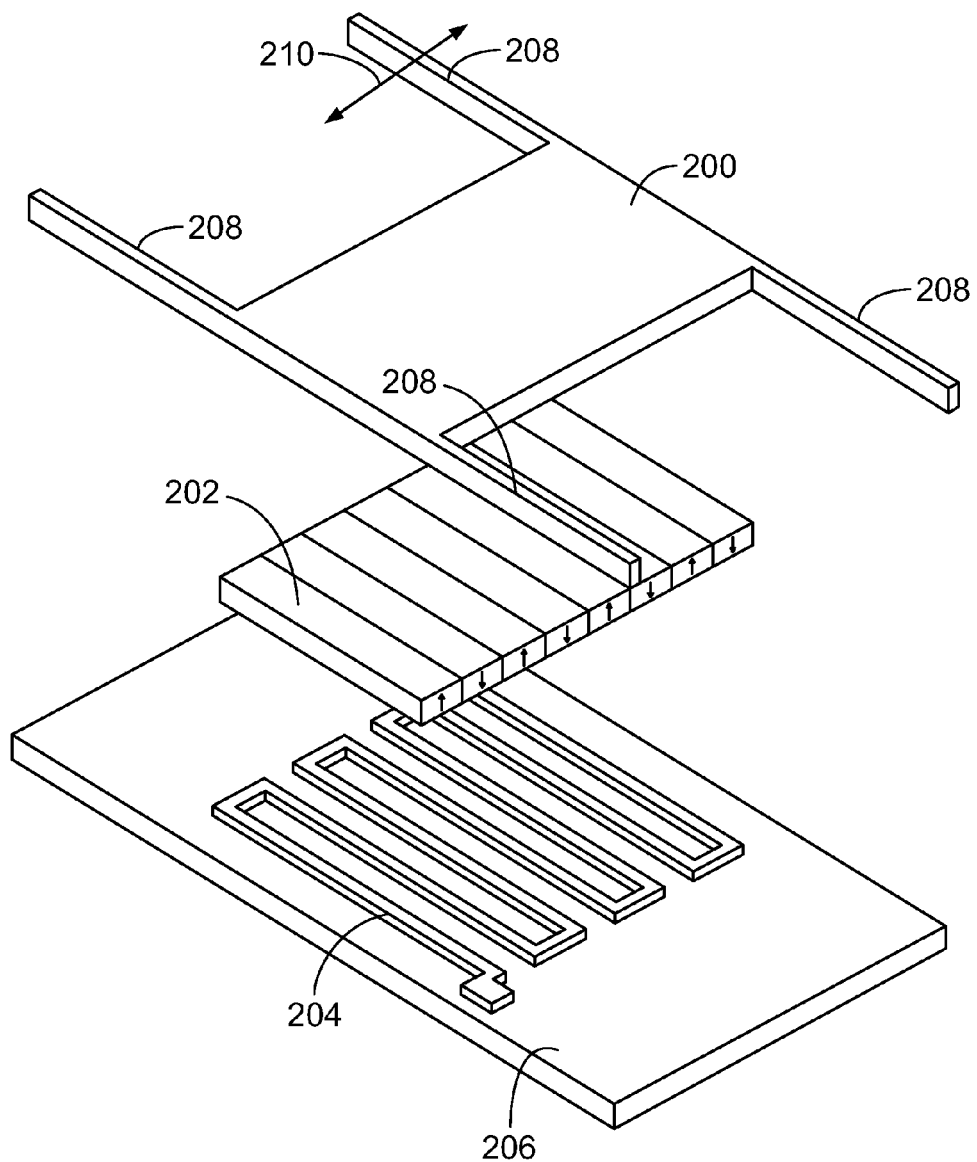
FIG. 2A is a block diagram illustrating an embodiment of a power generator.

FIG. 2A is a block diagram illustrating an embodiment of a power generator. In the example shown, suspension sheet 200 is coupled to multipole magnet 202. Suspension sheet 200 is coupled to a surrounding structure—for example, by flexures 208—making a spring-mass structure that is capable of motion/oscillation in the direction indicated by 210. Multipole magnet 202 comprises a sheet magnet with alternating stripes of poles. The direction of motion along 210 is perpendicular to the stripes of multipole magnet 202 so that the motion causes a change in magnetic field to be experienced for a fixed structure nearby the moving sheet. Suspension sheet 200 and multipole magnet 202 move relative to multilayer circuit board 206. Multilayer circuit board 206 includes conductor 204 arranged to generate current in the event that a change in magnetic flux from a multipole magnet moves (e.g., multipole magnet 202). Conductor 204 is arranged in a serpentine pattern with long lines parallel to the magnetic sheet pole stripes and short legs across the stripes. In some embodiments, a conductor appears on a plurality of layers of multilayer circuit board 206. In various embodiments, conductors on each of the plurality of layers are electrically separate from each other, conductors on each of the plurality of layers are electrically connected, conductors on each of the plurality of layers are "in parallel" with each layer conductor path—for example, similar circuit path on each layer connected at the same ends on each layer, conductors on each of the plurality of layers are "in series" for each layer conductor path—for example, similar circuit path on each layer connected at opposite ends on each layer, or any other appropriate conductor connectivity and layout.

In some embodiments, multipole magnet 202 has dimensions 35 mm×40 mm×2 mm. There are 20 stripes of width 2 mm each. The strength of the magnet is about 0.3 Tesla in the range of interest (i.e., where multilayer circuit board 206 oscillates). The serpentines are arranged to line up with the magnetic pole stripes, and there are 20×3=60 on each layer of the printed circuit board (see FIG. 3A). In various embodiments, there are 3 loops, 5 loops, or any other appropriate number of loops. There are 6 layers in multilayer circuit board 206 for a total of 360 conductors. The total mass of the oscillator is 6 grams, which includes the circuit board and some connectors and spring attachments. The resulting oscillation frequency is about 75 Hz. The peak open circuit voltage generated is about 5 volts. The coil resistance is about 10 Ohms, so when the coil is terminated with 10 Ohm resistor, the resulting peak power is 2.5 watts (5 volts, 0.5 amps). However, the average power generated over 20 mSec, which is the relevant time window for a light switch, is about 100 mW. Since this product operates in free oscillation mode, there really isn't an off-resonance operating point.

Figure 2B:
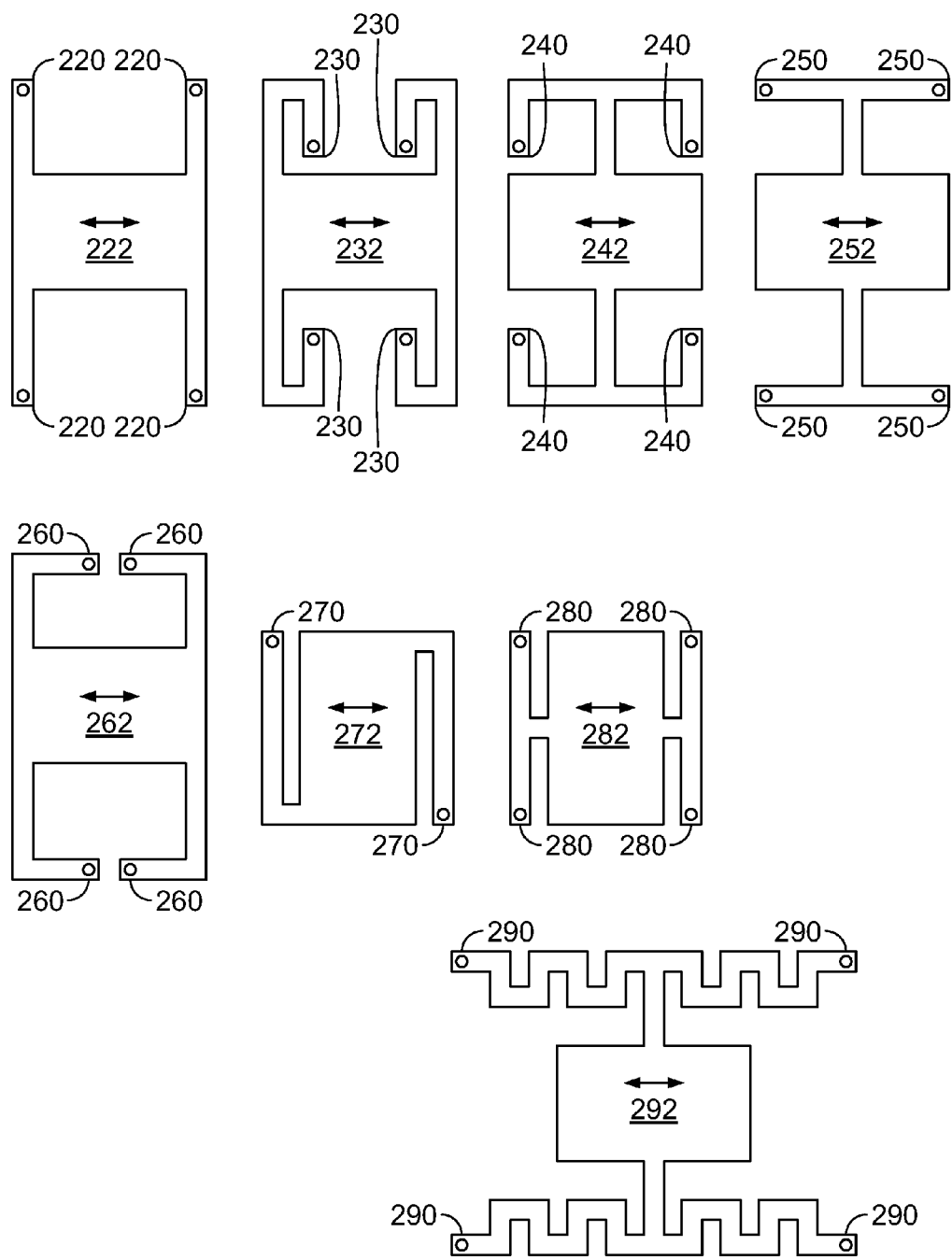
FIG. 2B are block diagrams illustrating embodiments of suspension sheet geometries.

FIG. 2B are block diagrams illustrating embodiments of suspension sheet geometries. In the examples shown, attachment points are shown for each suspension sheet (e.g., 220, 230, 240, 250, 260, 270, 280, and 290) and a direction for oscillation (e.g., 222, 232, 242, 252, 262, 272, 282, and 292). In some embodiments, the suspension sheets in FIG. 2B are made of a material that is cut or stamped or molded. In some embodiments, the suspension sheets are fabricated from a plastic. In various embodiments, the spring constant of the suspension is tuned by selecting material type, selecting material thickness, selecting material width along the arms that extend from the central body of the suspension platform to the attachment points, or any other appropriate manner of tuning the spring constant. In various embodiments, the oscillation frequency of the suspension plus multipole magnet or multilayer circuit board is tuned by selecting material type of the suspension, selecting mass of the central body of the suspension, selecting mass of the multipole magnet, selecting mass of the multilayer circuit board, or any other appropriate manner of tuning the oscillation frequency.

Figure 3A:
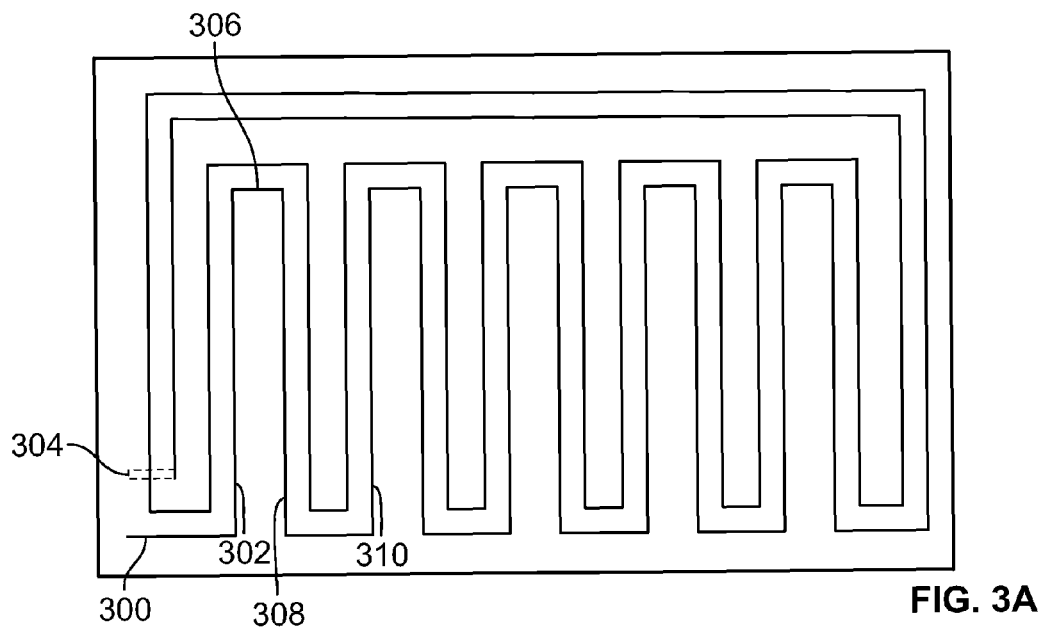
FIG. 3A is a block diagram illustrating an embodiment of a conductor layout on a layer of a multilayer circuit board.

FIG. 3A is a block diagram illustrating an embodiment of a conductor layout on a layer of a multilayer circuit board. In the example shown, conductor end 300 is coupled to conductor 302 running parallel to a magnet stripe on a multipole magnet. Conductor 302 is coupled to conductor 306 running across the magnet stripe. Conductor 306 is also coupled to conductor 308 running parallel to the magnet stripe in the multipole magnet. Similar conductors are arranged to surround other magnet stripes of the multipole magnet and are configured to generate a current when the multipole magnet moves from the change in magnetic flux enclosed by the area between conductors (e.g., between 308 and conductor 310). The conductor is arranged in a serpentine which doubles back and ends at conductor end 304. In this way, there are multiple serpentine conductors wired in series on a single layer of the circuit board. FIG. 3A shows two serpentine conductors in series. In some embodiments, conductor is on multiple layers of a circuit board and connected to other layers using vias.

Figure 3B:
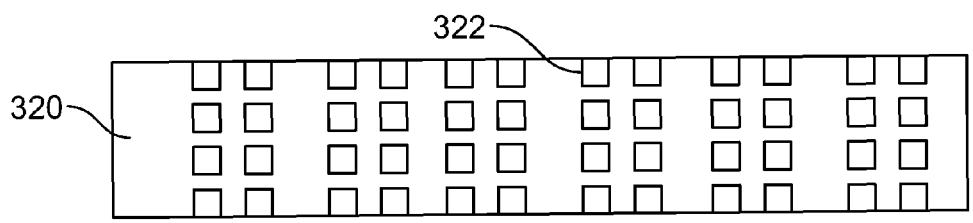
FIG. 3B is a block diagram illustrating an embodiment of a conductor in cross section view.

FIG. 3B is a block diagram illustrating an embodiment of a conductor in cross section view. In the example shown, multilayer circuit board 320 includes a plurality of conductors shown in cross section (e.g., conductor 322). The conductors are similar in pattern to those shown in FIG. 3A on each layer of the multilayer circuit board.

Figure 3C:
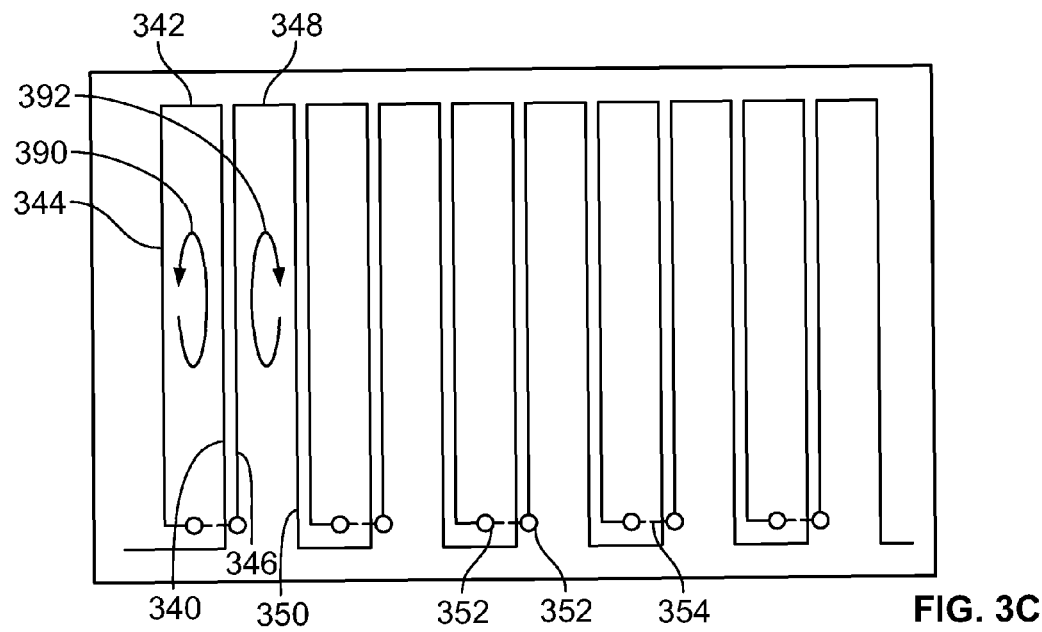
FIG. 3C is a block diagram illustrating an embodiment of a conductor on a layer of a multilayer circuit board.

FIG. 3C is a block diagram illustrating an embodiment of a conductor on a layer of a multilayer circuit board. In the example shown, the loop created by conductor 340, conductor 342, and conductor 344 generates current from one polarity of magnet of the magnetic sheet. The loop created by conductor 346, conductor 348, and conductor 350 generates current from another polarity of magnet of the magnetic sheet. The loops are connected in series through vias (e.g., vias 352). Conductor 354 is on a different layer than conductor 340, conductor 342, conductor 344, conductor 346, conductor 348, and conductor 350. In the example shown, conductor end 340 is connected to conductor end 344 through a series of vias (e.g., via 348). In the example shown, all conductors are on the same layer except those shown with a dotted line (e.g. 354). The end of conductor 344 attaches to a via which drops to a different layer so that it can go back underneath 340, but conductors 340 and 344 are on the same layer. Loop 390 generates a current from one polarity of magnet of the magnetic sheet. Loop 392 generates a current from another polarity of magnet of the magnetic sheet.

Figure 3D:
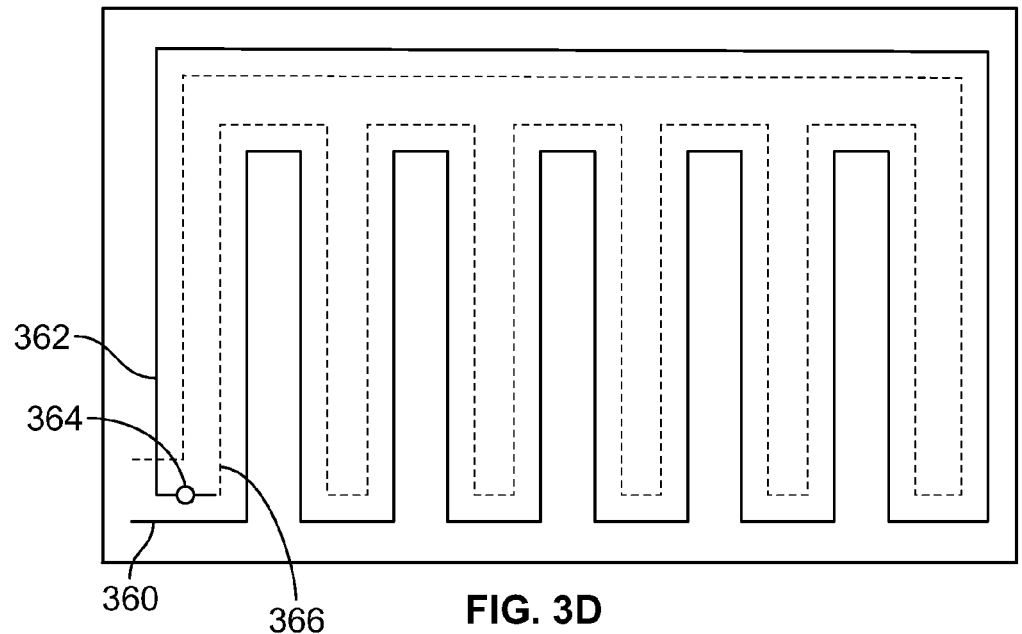
FIG. 3D is a block diagram illustrating an embodiment of a conductor on two layers of a multilayer circuit board.

FIG. 3D is a block diagram illustrating an embodiment of a conductor on two layers of a multilayer circuit board. In the example shown, conductor 360 is connected to conductor 362 on one layer of a circuit board by means of a serpentine similar to the serpentine in FIG. 3A. Conductor 362 on one layer is connected to conductor 366 on a second layer (shown by a dashed line) by means of via 364 which connects the two layers together. In this way the two serpentine conductors shown in FIG. 3D are wired together in series. While only two layers are shown, this method can be applied to any number layers.

Figure 3E:
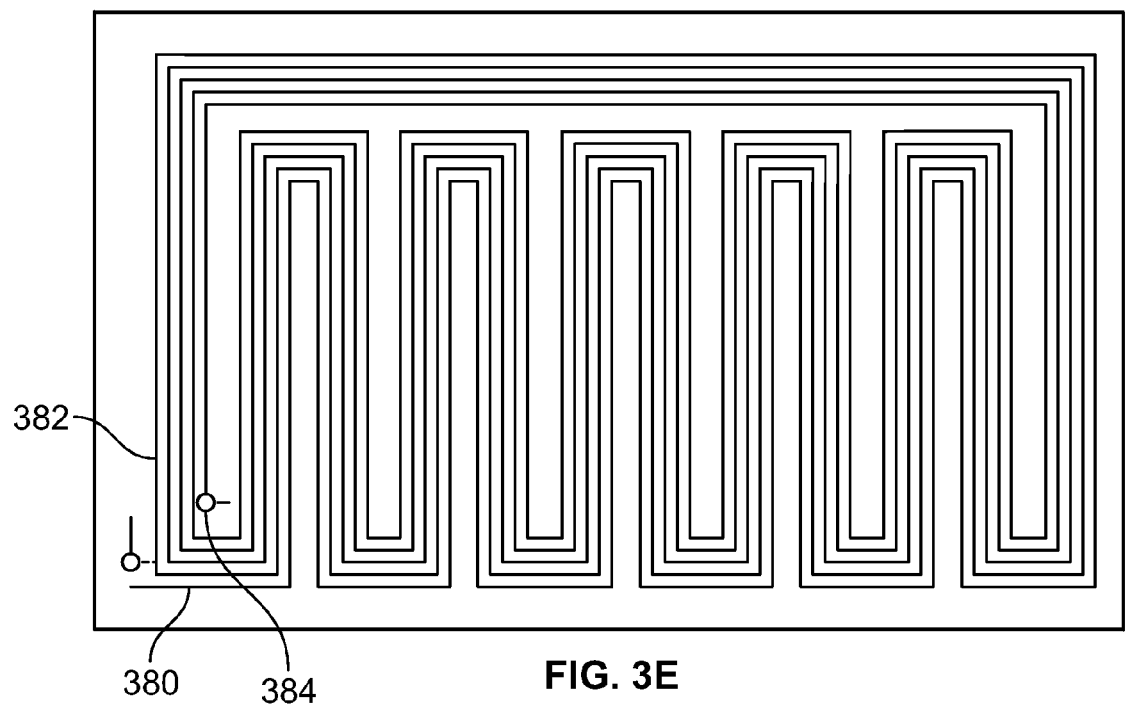
FIG. 3E is a block diagram illustrating an embodiment of a multilayer circuit board with five serpentine conductors on each one of multiple layers.

FIG. 3E is a block diagram illustrating an embodiment of a multilayer circuit board with five serpentine conductors on each one of multiple layers. In the example shown, conductor 380 is connected to conductor 382 by means of the serpentines which are wrapped around on each other similar to the serpentine in FIG. 3A. As shown, the 5 serpentines are wired in series. The serpentine conductors in each layer can then be connected to identical serpentines on other layers by means of a via such as via 384. Any number of layers could be connected together in this manner. For example, if six layers are used and each layer is connected in series with the subsequent layer similar as the layers in FIG. 3D are connected, then there would be thirty serpentine conductors all connected in series.

In some embodiments, the planar conductors are made out of stamped and laminated (or laminated then stamped) metal. The metal layers are separated by an insulated layer and connected to each other with metal vias in the insulated layer. In various embodiments, the conductors comprise wound wire or placed wire in a form or potted in an epoxy or plastic. In various embodiments, the conductors are in a serpentine shape, are in a coil shape, are on a single layer, are on a plurality of layers, are on a planar surface, are three dimensional in shape (e.g., a spiral, a laddered serpentine, etc.), or any other appropriate configuration for offering an area to a magnetic flux that results in a generation of power in the event that there is relative motion between the conductor(s) and the multipole magnet.

In some embodiments, the serpentine conductor offers areas appropriate for a two dimensional array of alternating polarity magnets.

Figure 4A:
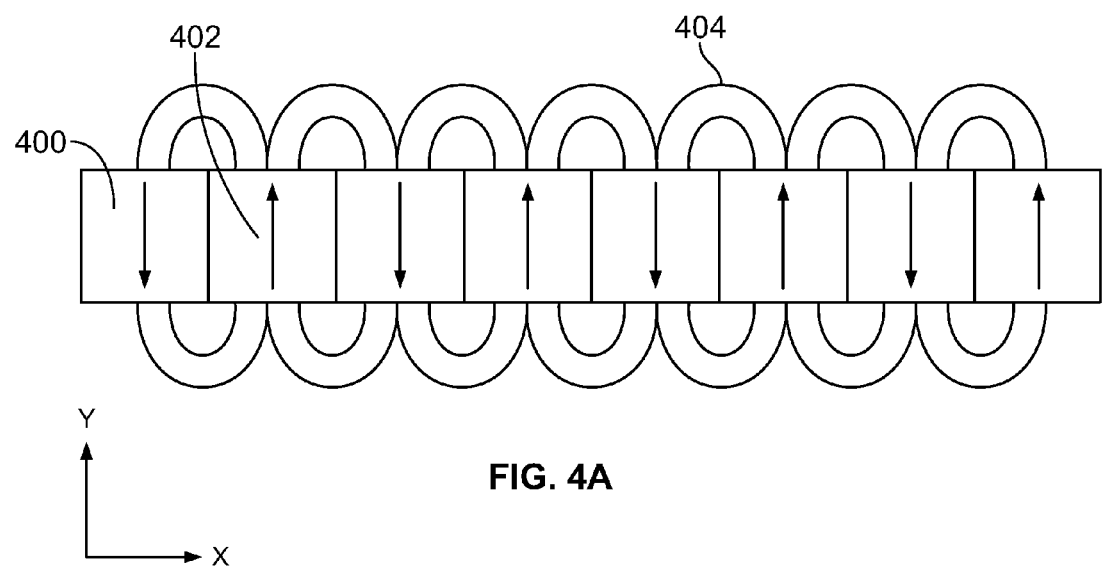
FIG. 4A is a block diagram illustrating an embodiment of a multipole magnet.

FIG. 4A is a block diagram illustrating an embodiment of a multipole magnet. In the example shown, the end view of magnet stripes (e.g., north end stripe 400, south end stripe 402) in a mutlipole magnet are shown along with magnetic field lines (e.g., field lines 404). Directly above the center of one of the poles the magnetic field is almost entirely in the Y direction. Directly above the transition from one pole to another, the magnetic field lines are almost entirely in the X-direction.

Figure 4B:
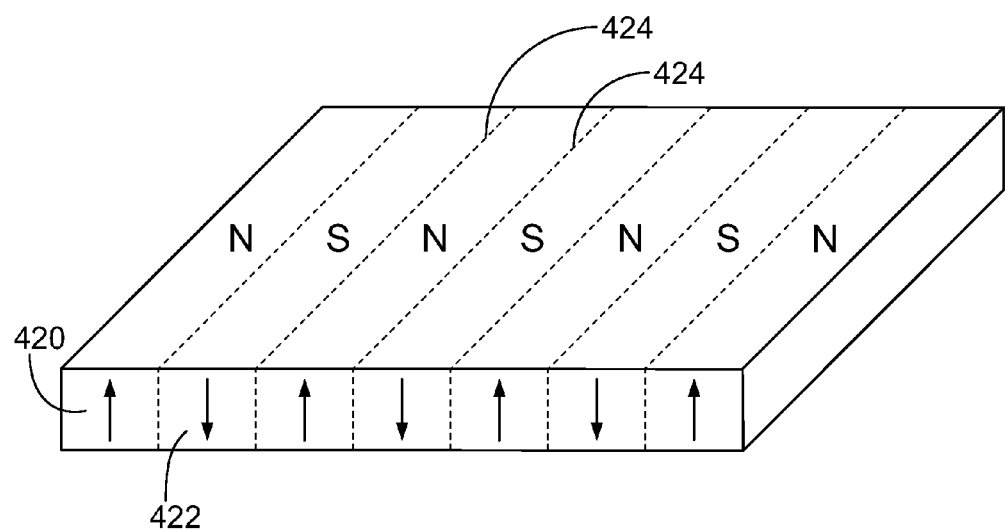
FIG. 4B is a block diagram illustrating an embodiment of a multipole magnet in the form of a magnetic sheet.

FIG. 4B is a block diagram illustrating an embodiment of a multipole magnet in the form of a magnetic sheet. In the example shown, the magnetic sheet is poled such that it has stripes or lines of alternating polarity. Magnet stripe 420 is a north section and magnet stripe 422 is a south poled section. The dotted lines 424 indicate boundaries between magnetic stripes, but are not physical separations in the magnetic sheet.

In some embodiments, the magnetic sheet is poled such that it has a two dimensional array of magnets of alternating polarity.

Figure 4C:
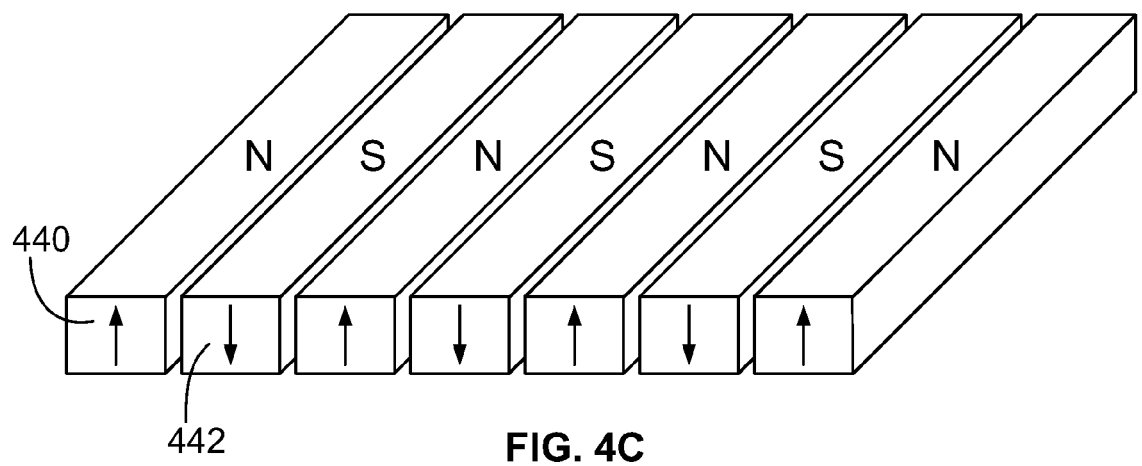
FIG. 4C is a block diagram illustrating an embodiment of a multipole magnet in the form of an array of bar magnets.

FIG. 4C is a block diagram illustrating an embodiment of a multipole magnet in the form of an array of bar magnets. In the example shown, the bars are arranged in alternating fashion. As shown in the figure, bar magnet 440 is placed with its north pole facing up, and the adjacent bar magnet 442 is placed with its south pole facing up. In some embodiments, bar magnets are affixed to a plane or flat substrate with an adhesive.

Figure 5A:
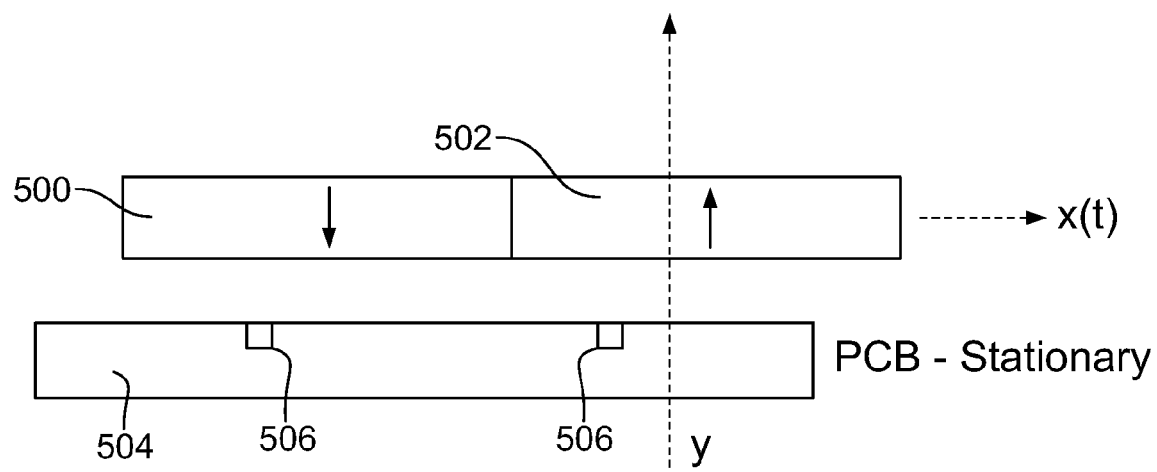
FIG. 5A is a block diagram illustrating an embodiment of a power generator.

FIG. 5A is a block diagram illustrating an embodiment of a power generator. In the example shown, directly above the center of one of the poles (e.g., poles of magnetic stripe 500 or magnetic stripe 502), the magnetic field is almost entirely in the Y direction. It is the Y direction magnetic field that is enclosed by conductors 506. As the proof mass (e.g., the multipole magnet sheet in this diagram) moves back and forth in the X direction, the magnetic flux enclosed by conductors 506 changes generating a voltage across and/or a current in conductors 506. Circuit board 504 (e.g., a stationary printed circuit board (PCB)) includes conductors 506 (e.g., lines of metal etched to appropriate shapes using standard PCB fabrication). As shown, circuit board 504 comprises one layer, however, in various embodiments comprises a plurality of layers.

It should be noted that the Y direction magnetic flux experienced by conductors 506 drops off as the magnets move apart in the Y direction because the strength of Y direction magnetic field also drops off. However, this effect is small compared to the voltage generated by the X direction motion.

Figure 5B:
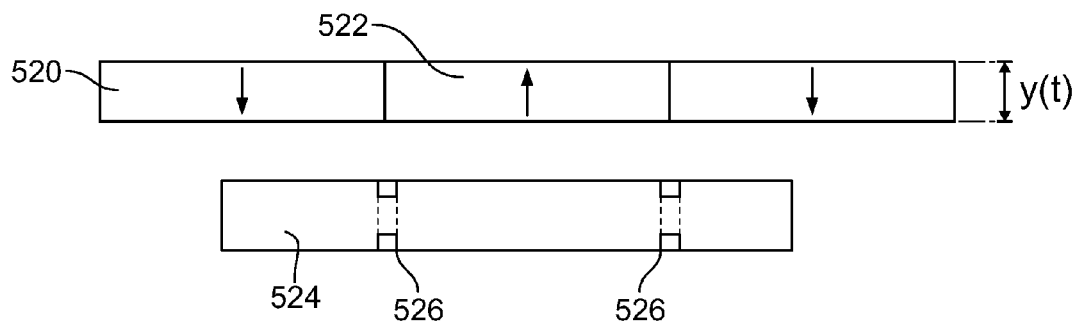
FIG. 5B is a block diagram illustrating an embodiment of a power generator.

FIG. 5B is a block diagram illustrating an embodiment of a power generator. In the example shown, power can also be generated from motion along the y axis. Directly above the transition from one pole to another (e.g., poles of magnetic stripe 520 and magnetic stripe 522), the magnetic field lines are almost entirely in the X-direction. Motion in the Y direction will produce voltage across coil conductors 526. Coil conductors 526 are shown in cross section. The flux linked by the coils will drop off as the magnets (or multilayer circuit board 524 in some embodiments) moves in the Y direction. Coil conductors 526 of FIG. 5B and coil conductors 506 of FIG. 5A can coexist on multilayer circuit board 524 (e.g., a PCB). Thus power can be generated by motion in both the X and Y direction.

It should be noted that the embodiment shown in FIG. 5B can also generate power by motion in the X direction. As the multipole magnet moves in the X direction, the X direction magnetic flux enclosed by conductors 526 changes creating a voltage across those coil conductors. Coil conductors 526 of FIG. 5B and coil conductors 506 of FIG. 5A can coexist and both produce power from motion in either the X or Y directions.

Figure 6:
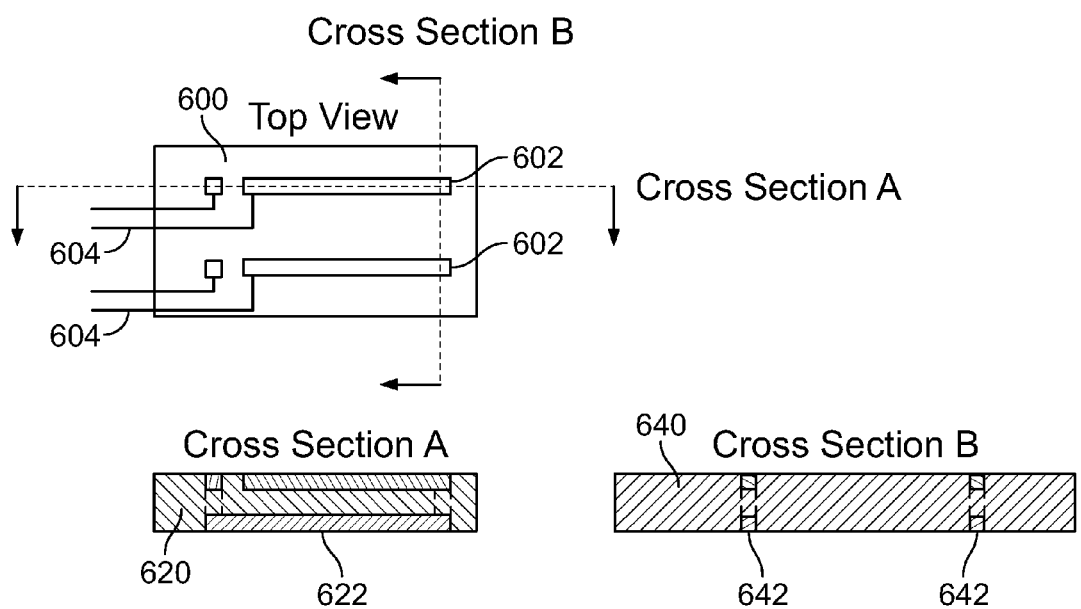
FIG. 6 are block diagrams illustrating embodiments of a coil conductor.

FIG. 6 are block diagrams illustrating embodiments of a coil conductor. In some embodiments, coil conductors in FIG. 6 are used to implement 526 of FIG. 5B. In the example shown, top view of multilayer circuit board 600 includes conductors 602 and conductors for current to be generated in response to flux changes. Conductors 602 and conductors 622 and conductors 642 show a coil structure used to capture flux changes. In some embodiments, conductors 602 are connected to a power management circuit using lines 604. In various embodiments, conductors 602 are connected in parallel, in series, or in any other appropriate manner with a power management circuit. Top view shows cross section A and cross section B lines. Cross section A shows a side view of multilayer circuit board 620. Cross section B shows a side view orthogonal to cross section B of multilayer circuit board 640.

Figure 7:
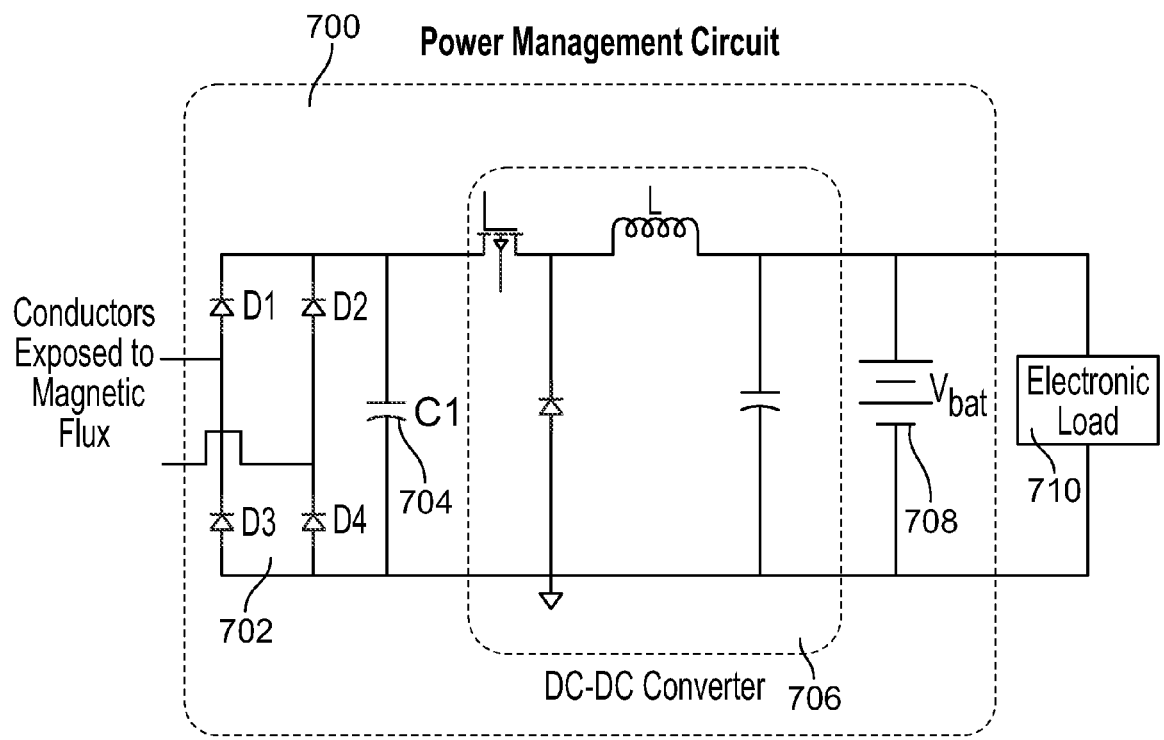
FIG. 7 is a block diagram illustrating an embodiment of a power management circuit.

FIG. 7 is a block diagram illustrating an embodiment of a power management circuit. In the example shown, power management circuit 700 comprises diode rectifier 702, capacitor 704, DC-DC converter 706, battery 708, and electronic load 710. Conductors exposed to changing magnetic flux produce a voltage/current that is fed into diode rectifier 702. Diode rectifier 702 rectifies an alternating voltage/current to a single polarity voltage/current. The single polarity voltage/current is smoothed using capacitor 704. The smoothed voltage/current is converted to a desired DC value using DC-DC converter 706. DC-DC converter 706 comprises a switch allowing a portion of an input voltage/current to charge a capacitor. The portion can be varied by varying the amount that the switch is on. The portion controls the voltage converted to. The converted voltage is fed to battery 708 and electronic load 710. In some embodiments, there is a switch between battery 708 output and electronic load 710 to control whether the output power is allowed to be input to electronic load 710.

Figure 8:
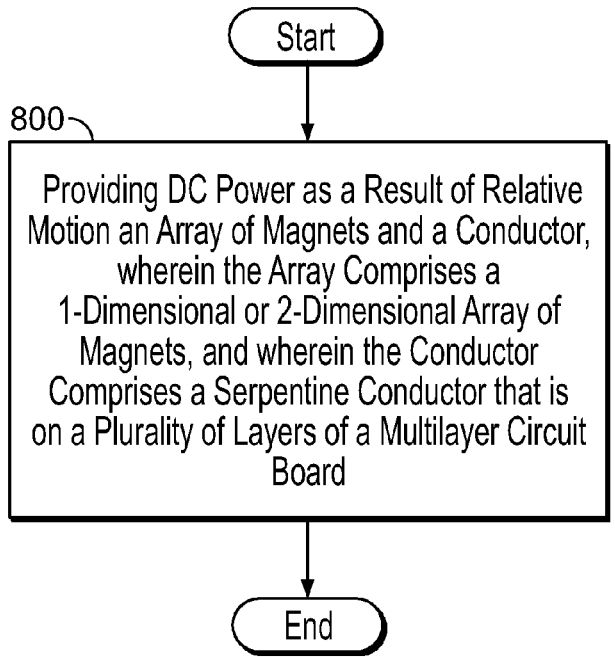
FIG. 8 is a flow diagram illustrating an embodiment of a process for generating power.

FIG. 8 is a flow diagram illustrating an embodiment of a process for generating power. In the example shown, in 800 DC power is provided as a result of relative motion between an array of magnets and a conductor, wherein the array comprises a one dimensional or two dimensional array of magnets, and wherein the conductor comprises a serpentine conductor that is on a plurality of layers of a multilayer printed circuit board.

Figure 9:
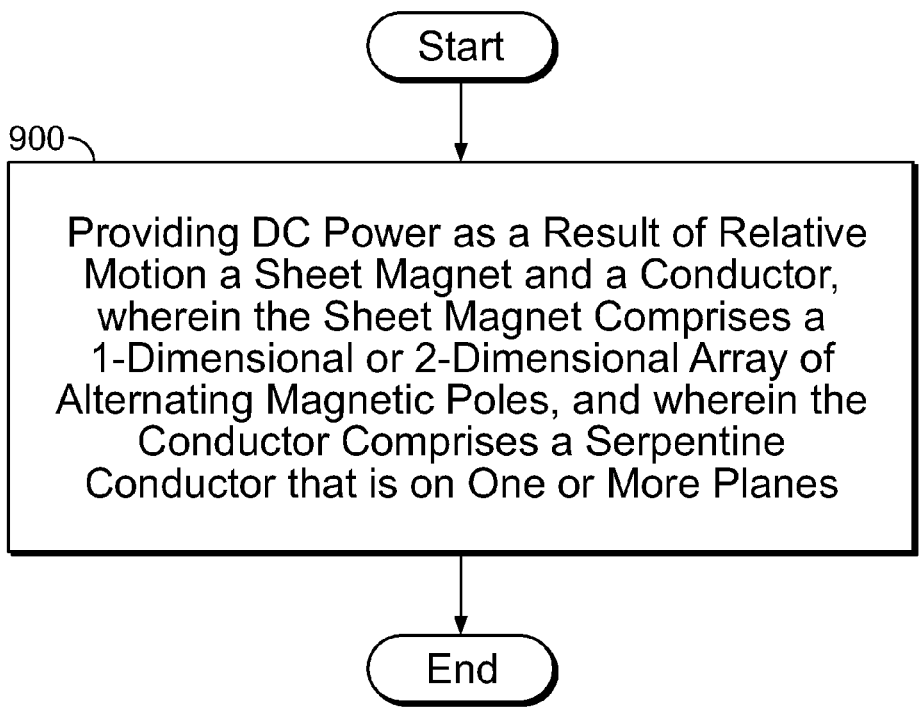
FIG. 9 is a flow diagram illustrating an embodiment of a process for power management.

FIG. 9 is a flow diagram illustrating an embodiment of a process for generating power. In the example shown, in 900 DC power is provided as a result of relative motion between a sheet magnet and a conductor, wherein the array comprises a one dimensional or two dimensional array of alternating magnetic poles, and wherein the conductor comprises a serpentine conductor that is on one or more planes.

A wireless switch is disclosed. The wireless switch comprises a mechanical oscillator, a mechanical impulse deliverer, an array of magnets, a conductor, a power management circuit, and a power management circuit. The mechanical impulse deliverer delivers a mechanical impulse to the mechanical oscillator when the wireless switch is switched. The array comprises a one dimensional or two dimensional array of magnets positioned on a planar surface. The conductor comprises a serpentine conductor. The power management circuit provides DC power as a result of relative motion due to the mechanical oscillator between the array of magnets and the conductor.

A wireless switch is disclosed. The wireless switch comprises a mechanical oscillator, a mechanical impulse deliverer, a multipole magnet, a set of coils, and a power management circuit. The mechanical impulse deliverer delivers a mechanical impulse when the wireless switch is switched to the mechanical oscillator. There is relative motion due to the mechanical oscillator between the set of coils and the multipole magnet. The power management circuit uses a current generated by having relative motion between the set of coils and the mulitpole magnet to generate power for transmitting a wireless signal indicating that the wireless switch has been switched.

In some embodiments, suspension springs that are preloaded are advantageous. A preloaded generator works as follows. The suspension springs are initially held in a preloaded position by some ratcheting or friction mechanism. When a user actuates the device (e.g., a wireless switch), the ratcheting mechanism pushes a proof mass and springs slightly further in the direction of the preload and then releases the mechanism. A ratcheting wheel rotates counter clockwise to complete this action. The wheel, however, cannot rotate in the clockwise direction. Once released, the proof mass oscillates to the far side and back, catching the ratcheting mechanism on the return. Thus, the system remains in preload for the next actuation. Depending on timing, the proof mass may oscillate more than once before catching the ratcheting mechanism, but it cannot oscillate so long that its amplitude is too low to re-engage the ratcheting mechanism.

In some embodiments, a proof mass is caught by a latch. The latch is released when a user pulls or pushes on the device. The latch is released when latch makes contact after moving due to the displacement of the proof mass as a result of the user pull or push.

There are two advantages of this type of design for a power generator: 1) The maximum voltage is proportional to maximum velocity, and by preloading the springs, the maximum velocity in increased in this design; and 2) All of the energy collection happens very quickly, in the first oscillation or first few oscillations—thus, the maximum power is higher, although the total energy generation is not. Compressing the energy generation into a shorter time interval can be advantageous for some applications.

In some embodiments the mechanical impulse deliverer is actuated by a button, a lever, a rotary dial, a toggle switch, etc. The impulse deliverer displaces a proof mass a given distance and then release the proof mass while leaving space for the proof mass to oscillate without interference.

In some embodiments, the conductor is implemented by means of a multilayer circuit board. In various embodiments, the conductor comprises a serpentine conductor, a set of coils, multiple layers of conductor, multiple structures corresponding to multiple poles, or any other appropriate conductor.

Figure 10A:
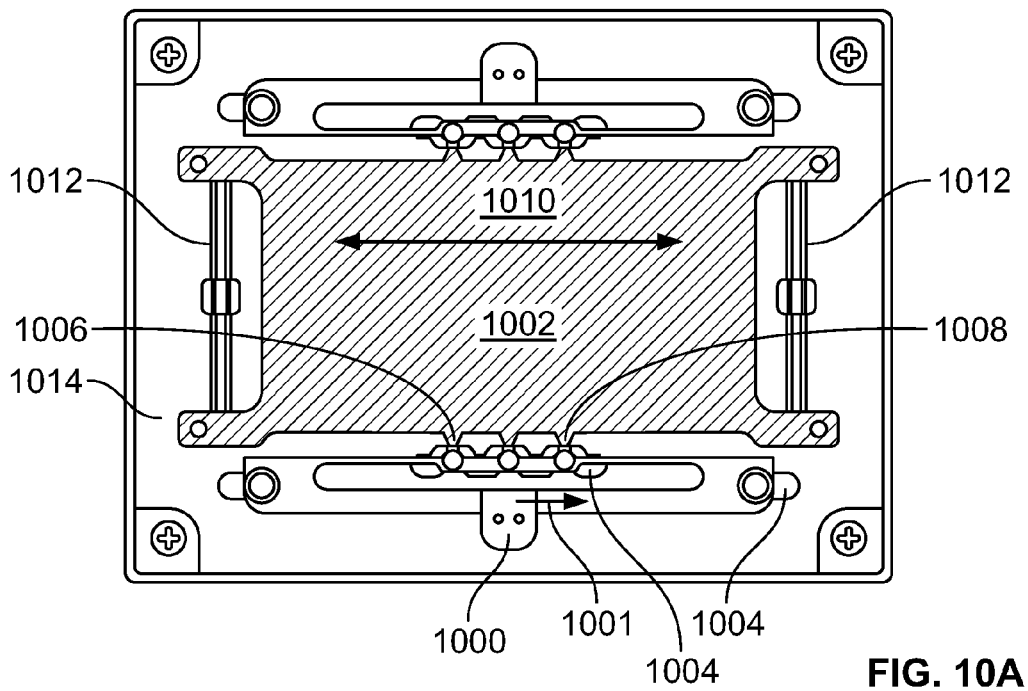
FIGS. 10A and 10B are block diagrams illustrating embodiments of wireless switches.

FIG. 10A is a block diagram illustrating an embodiment of a wireless switch. In the example shown, sliding actuator mechanism 1000 in direction 1001 (or opposite direction 1001) actuates proof mass 1002. Sliding actuator mechanism 1000 slides from one side to the other. Guides 1004 allow movement of interference features 1006 on sliding actuator mechanism 1000 into contact with mating features 1008 on proof mass 1002. As sliding actuator mechanism 1000 nears the end of its travel, guides 1004 move the interference features 1006 out of contact with mating features 1008 of proof mass 1002 leaving proof mass 1002 free to oscillate back and forth in the direction indicated by 1010 due to the spring characteristics of suspensions 1012. In some embodiments, suspensions are made of steel, stainless steel, brass, beryllium copper, plastic, etc. Suspensions 1012 suspend proof mass 1002 from substrate 1014 (e.g., suspensions are coupled to substrate 1014 in the middle and are coupled to proof mass 1002 at the ends). The magnitude of proof mass 1002 displacement is determined by the geometry of guides 1004 and interference features 1006 and mating features 1008. In some embodiments, proof mass 1002 displacement is 3 mm and the oscillation frequency of the switch is ~70 Hz. In some embodiments, the switch is approximately the size of a light switch. In some embodiments, proof mass 1002 has mass of ~6 g. The switch has two sliding actuator mechanisms (e.g., one at the top and sliding actuator mechanism 1000 at the bottom) that both are able to actuate proof mass 1002.

The oscillation of proof mass 1002 creates a relative motion between a multilayer circuit board and a multipole magnet (not shown in FIG. 10). For example, a multilayer circuit board mounted to the underside of proof mass 1002 and a multipole magnet mounted to substrate 1014.

Figure 10B:
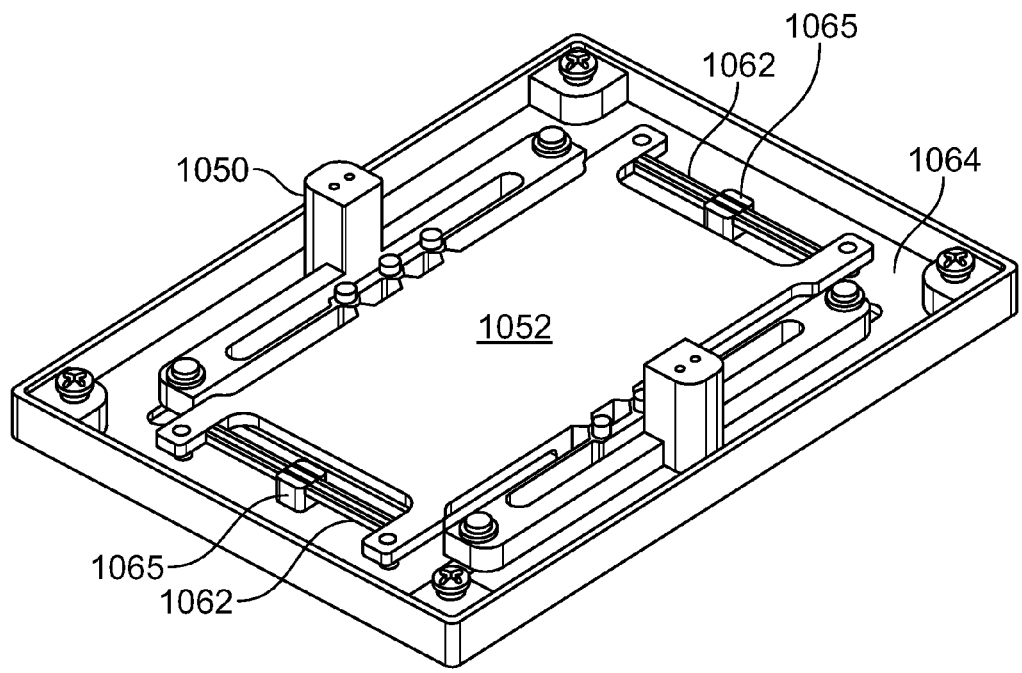

FIG. 10B is a block diagram illustrating an embodiment of a wireless switch. In the example shown, sliding mechanism 1050 is used to provide an impulse to proof mass 1052. Proof mass 1052 is suspended by suspensions 1062 from substrate 1064 using offsets 1065.

Figure 11:
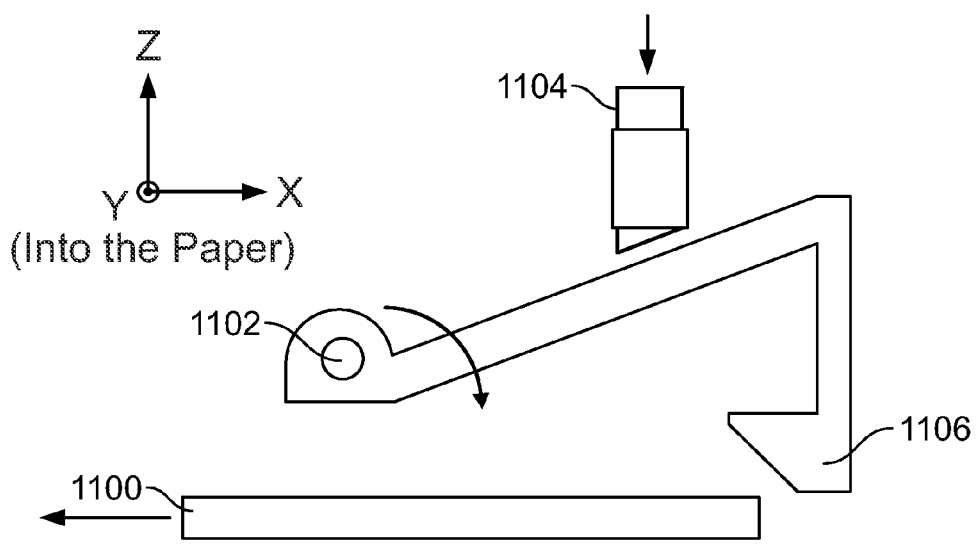
FIG. 11 is a block diagram illustrating an embodiment of a mechanism to actuate a proof mass using a push button or a rocker switch.

FIG. 11 is a block diagram illustrating an embodiment of a mechanism to actuate a proof mass using a push button or a rocker switch. In the example shown, as button or switch 1104 is pushed down, the pushing down causes a rotation about joint 1102. Interference feature 1106 pushes proof mass 1100 to one side (e.g., to the left). As button or switch 1104 nears the end of its travel, proof mass 1100 is released by interference feature 1106 leaving space for proof mass 1100 to oscillate. As shown, the actuation mechanism (e.g., button or switch 1104) moves vertically (in the Z direction) to push proof mass 1100 horizontally to the left (e.g., in the negative X direction). In some embodiments, the same basic mechanism is used such that the actuation mechanism moves in the Y direction and the actuation subsequently pushes proof mass 1100 horizontally to the left (e.g., in the negative X direction).

Figure 12A:
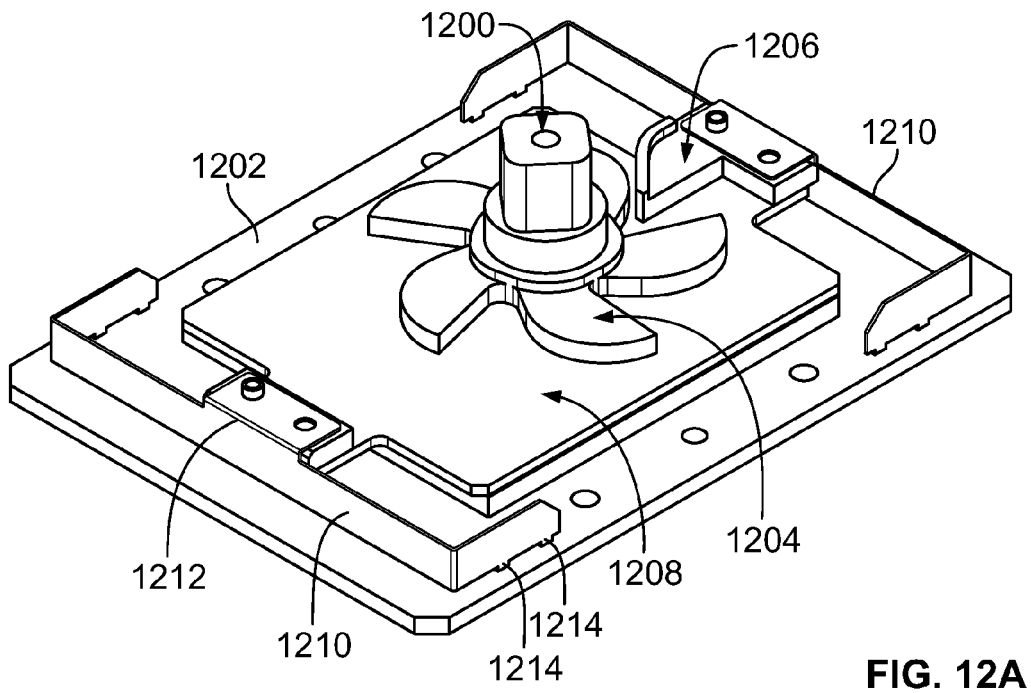
FIG. 12A-C are block diagrams illustrating embodiments of mechanisms to actuate a proof mass using a rotary dial.

FIG. 12A is a block diagram illustrating an embodiment of a mechanism to actuate a proof mass using a rotary dial. In the example shown, rotary dial 1200 is anchored to substrate 1202 by means not shown in the figure. Rotary dial 1200 when turned turns multi-lobed cam 1204. Multi-lobed cam 1204 pushes follower 1206 displacing and then releasing proof mass 1208. Follower 1206 is coupled to proof mass 1208 which are both suspended from substrate 1202 such that proof mass 1208 can oscillate with respect to substrate 1202. Proof mass 1208 is suspended from substrate 1202 by suspension 1210. Suspension 1210 is coupled to follower 1206 and proof mass 1208 in the middle (e.g., 1212) of suspension 1210 and is coupled to substrate 1202 at the ends (e.g., 1214). As shown, rotary dial 1200 turns 72 degrees to actuate and release proof mass 1208. In various embodiments, multi-lobed cam 1204 has 2, 3, 4, 5, 6, or any other appropriate number of lobes.

Figure 12B:
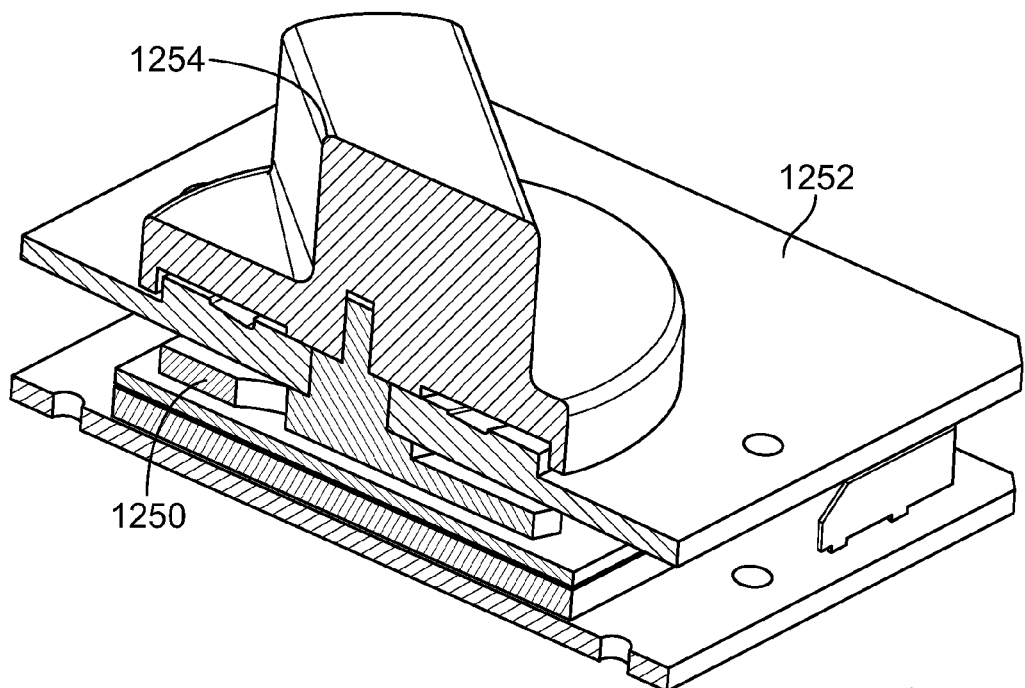

FIG. 12B is a block diagram illustrating an embodiment of a mechanism to actuate a proof mass using a rotary dial. In the example shown, rotary dial 1250 is moved by a user by moving dial 1254. Dial 1254 is coupled to cover 1252.

Figure 12C:
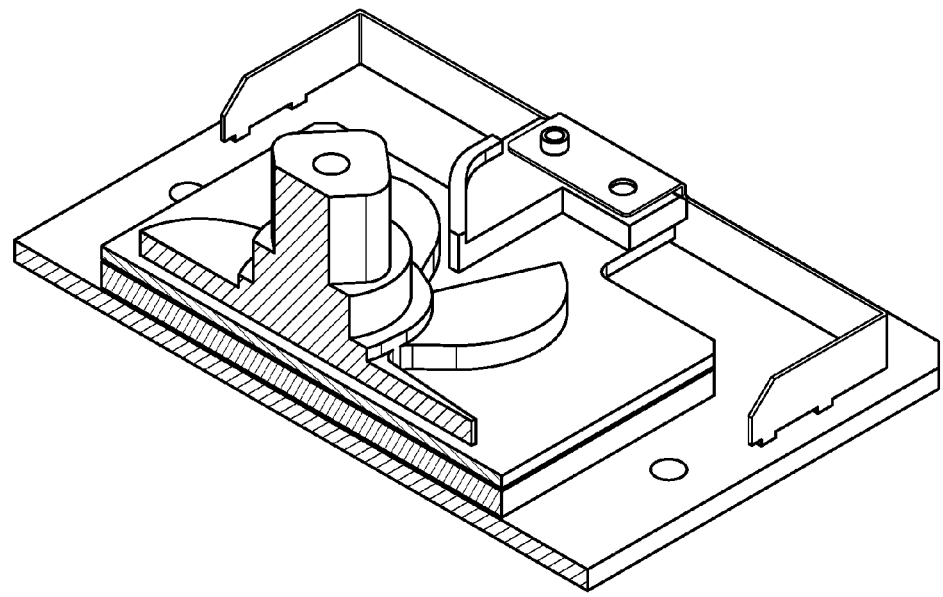

FIG. 12C is a block diagram illustrating an embodiment of a mechanism to actuate a proof mass using a rotary dial.

Figure 13:
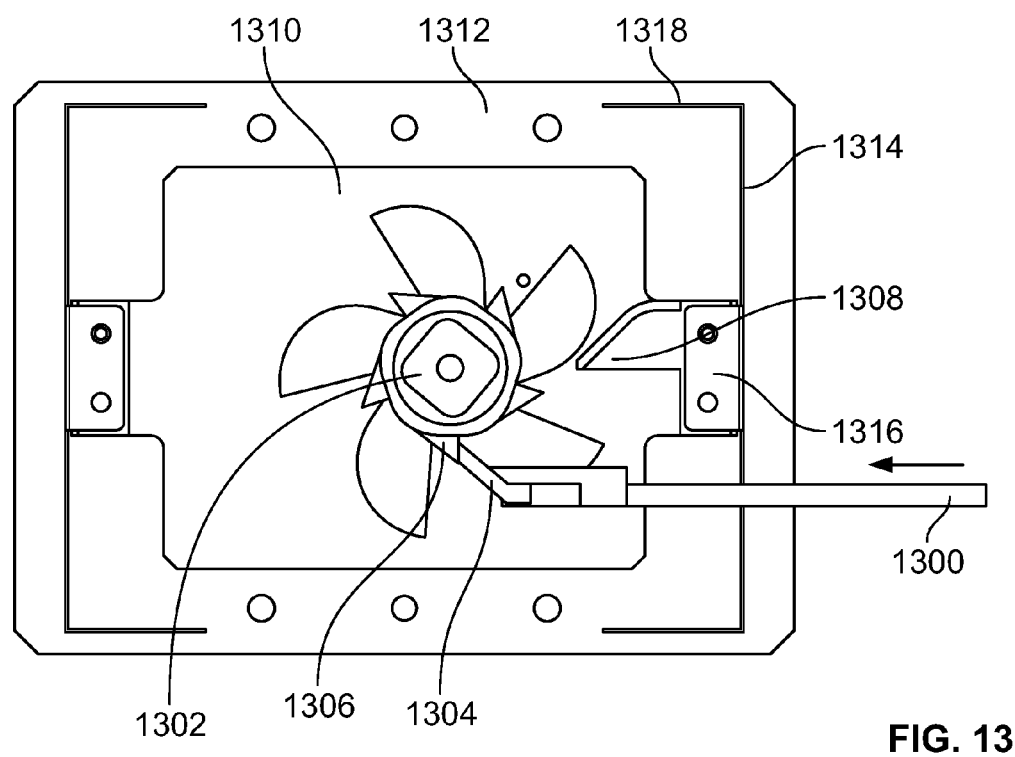
FIG. 13 is a block diagram illustrating an embodiment of a mechanism to actuate a proof mass using a sliding switch.

FIG. 13 is a block diagram illustrating an embodiment of a mechanism to actuate a proof mass using a sliding switch. In the example shown, sliding switch 1300, when pushed, rotates cam 1302 by means of ratchet 1306 and pawl 1304. Pawl 1304 pushes on a tooth of ratchet 1306, rotating the cam 1302. When slider switch 1300 returns to its original position, either by means of a spring (not shown) or by being manually returned, pawl 1304 rotates out of the way of the next ratchet tooth so that it does not allow cam 1302 to turn in the opposite direction. Cam 1302 pushes follower 1308 displacing and then releasing proof mass 1310. Follower 1308 is coupled to proof mass 1310 which are both suspended from substrate 1312 such that proof mass 1310 can oscillate with respect to substrate 1312. Proof mass 1310 is suspended from substrate 1312 by suspension 1314. Suspension 1314 is coupled to follower 1308 and proof mass 1310 in the middle (e.g., 1316) of suspension 1314 and is coupled to substrate 1312 at the ends (e.g., 1318).

Figure 14A:
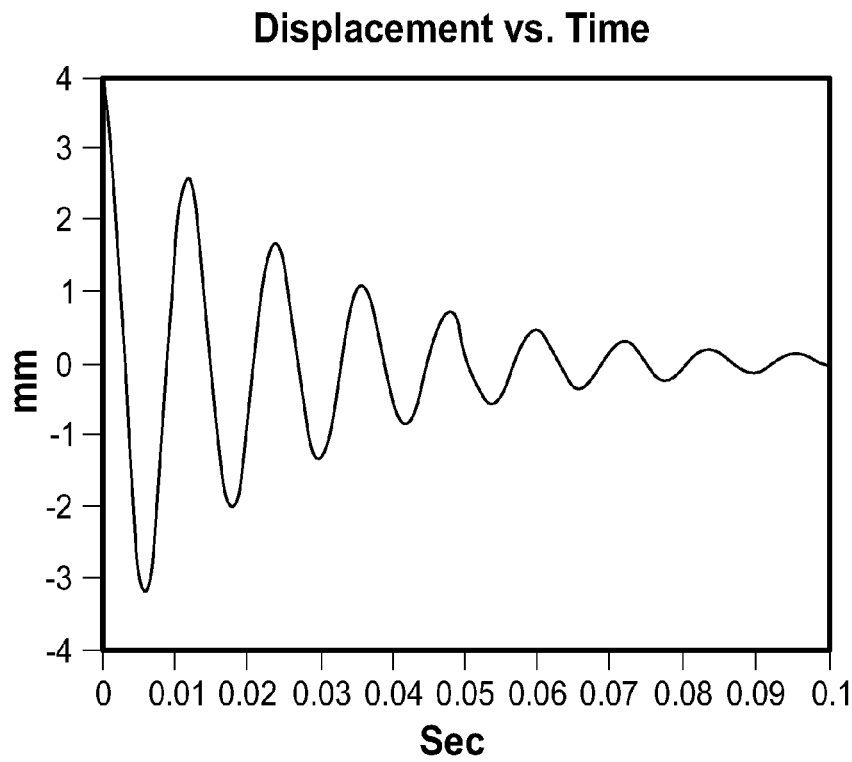
FIG. 14A is a graph illustrating a displacement of a proof mass during an oscillation after being actuated in one embodiment.

FIG. 14A is a graph illustrating a displacement of a proof mass during an oscillation after being actuated in one embodiment. In the example shown, the initial actuation is about 4 mm. The displacement damps down to about 3 mm for the next cycle peak after about 12 ms. The second cycle peak is at about 1.6 mm after about 24 ms. The third cycle peak is at about 1 mm after about 36 ms, etc.

Figure 14B:
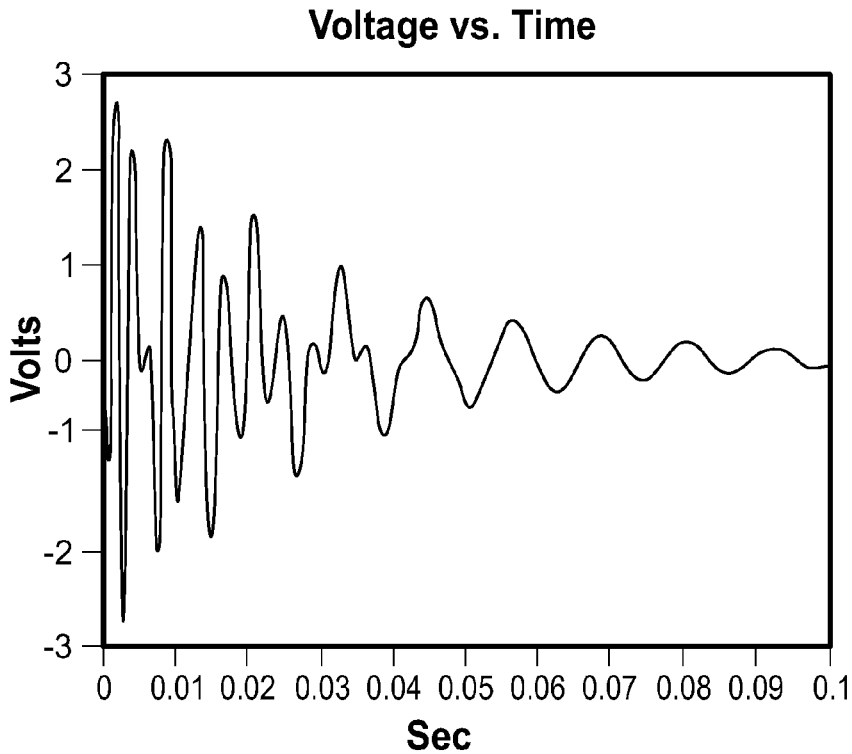
FIG. 14B is a graph illustrating a voltage generated over time after being actuated in one embodiment.

FIG. 14B is a graph illustrating a voltage generated over time after being actuated in one embodiment. In the example shown, voltage generated is plotted versus time after actuation of proof mass. The actuation results in an oscillation that damps down. Energy is generated over many oscillations. The voltage generated at the larger displacements right after the actuation shows voltage cycling at a higher frequency than the displacement. The higher frequency is due to the relative motion between the conductors on the multilayer circuit board and the multipole magnet being greater in amplitude than the pitch of the multipole magnet.

In some embodiments, energy generation takes up to a second. In some embodiments, it is necessary to capture the energy more quickly, which is achievable using a preloaded spring.

FIGS. 15A-D are block diagrams illustrating embodiments of a preloaded switch. In the example shown in FIG. 15A, spring 1500 is preloaded and held in position by catch mechanism 1502. Switch 1504 is coupled to beam 1512 which pivots on spring loaded pivot 1514. Pivot 1514 is coupled to housing 1516. Housing 1516 is also coupled to catch mechanism 1502, preloaded spring 1500, and multipole magnet 1510. Switch 1504 moves beam 1512 which in turn moves pusher 1518 that provides an impulse to proof mass 1506. When a user pushes switch 1504 (or turns a dial, or inputs a displacement to proof mass 1506 by any other means), preloaded spring 1500 is compressed slightly further releasing catch mechanism 1502 and proof mass 1506. Proof mass 1506 makes one oscillation "over and back" and is caught and latched by catch mechanism 1502 on its return. Proof mass 1506 includes multilayer circuit board 1508. Multilayer circuit board 1508 is moved relative to multipole magnet 1510. The motion enables a current to be generated, which can be used as a source of energy (e.g., turned into stored power by rectifying the current and using the current to power a circuit or to charge a battery or capacitor which can later power a circuit such as a transmitter or processor).

The energy input by the user is the same as the non-preloaded case. However, when proof mass 1506 is released, the energy stored in preloaded spring 1500 is much larger than without preloading. Therefore the peak power during the first oscillation is higher, but the total energy generated will be equal to the non pre-loaded case.

Figure 15A:
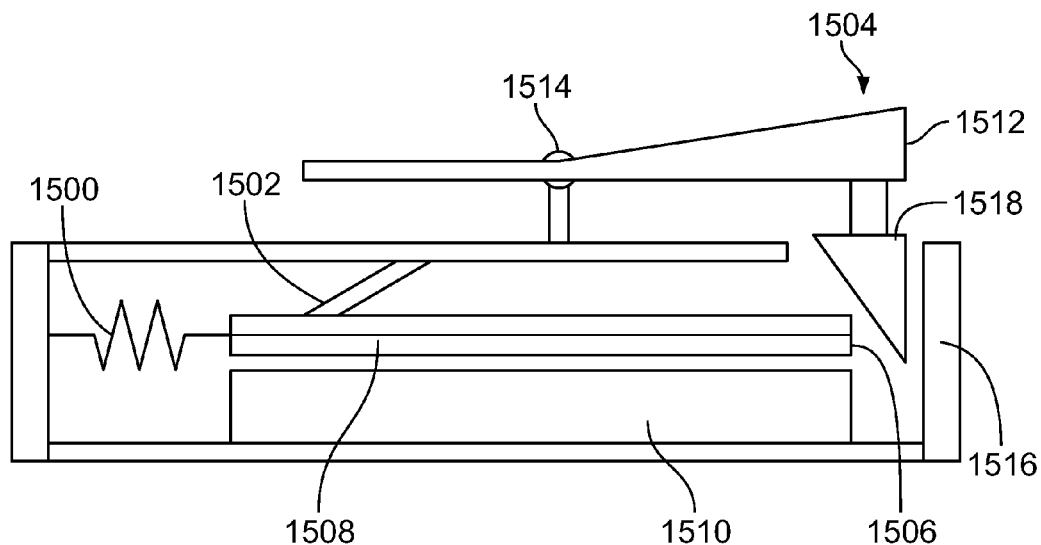
FIGS. 15A-D are block diagrams illustrating embodiments of a preloaded switch.
Figure 15B:
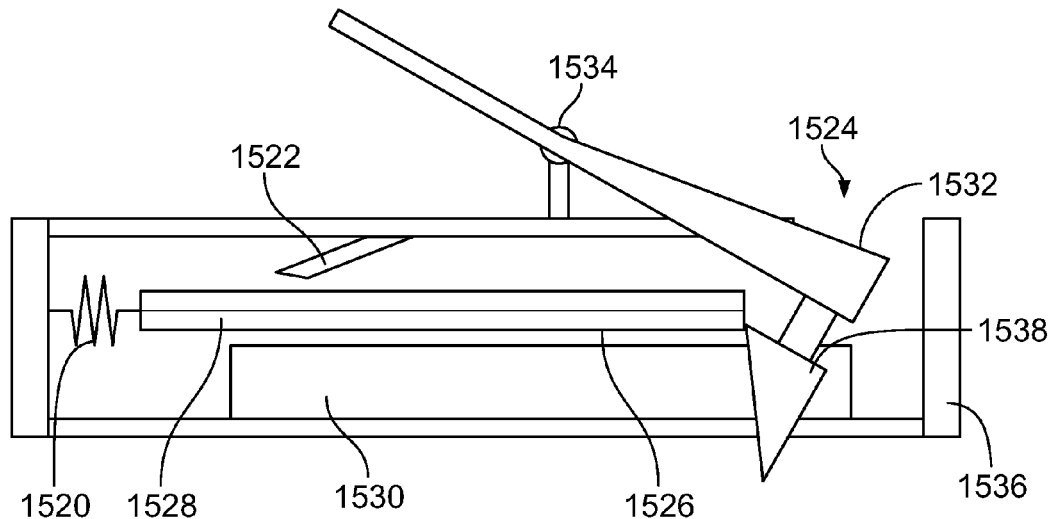

In the example shown in FIG. 15B, preloaded spring 1520 is compressed further by pusher 1538, which has been pushed by switch 1524 that in turn pivots beam 1532 about spring loaded pivot 1534. Catch mechanism 1522 moves out of the way as proof mass 1526 further compresses preloaded spring 1520. Spring loaded pivot 1534 is coupled to housing 1536. Housing 1536 is also coupled to catch mechanism 1522, preloaded spring 1520, and multipole magnet 1530. Proof mass 1526 includes multilayer circuit board 1528. Multilayer circuit board 1528 is moved relative to multipole magnet 1530.

Figure 15C:
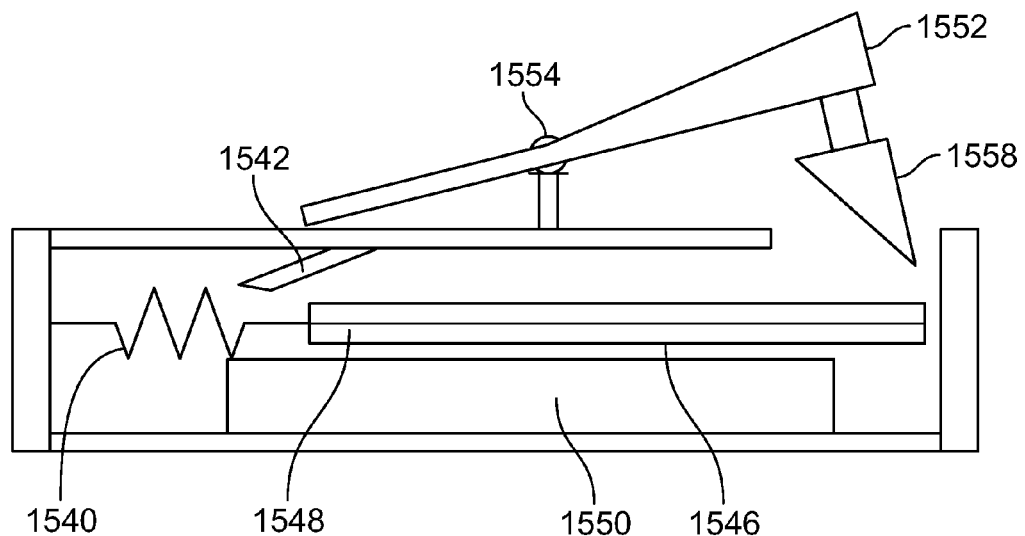

In the example shown in FIG. 15C, preloaded spring 1540 is allowed to rapidly decompress pushing proof mass 1546 with multilayer circuit board 1548 relative to multipole magnet 1550. Pusher 1558 does not interfere with the rapid decompression of preloaded spring 1540 or proof mass 1546 by being moved out of the way. Pusher 1558, beam 1552, spring loaded pivot 1554, and catch mechanism 1542 return to their original positions.

Figure 15D:
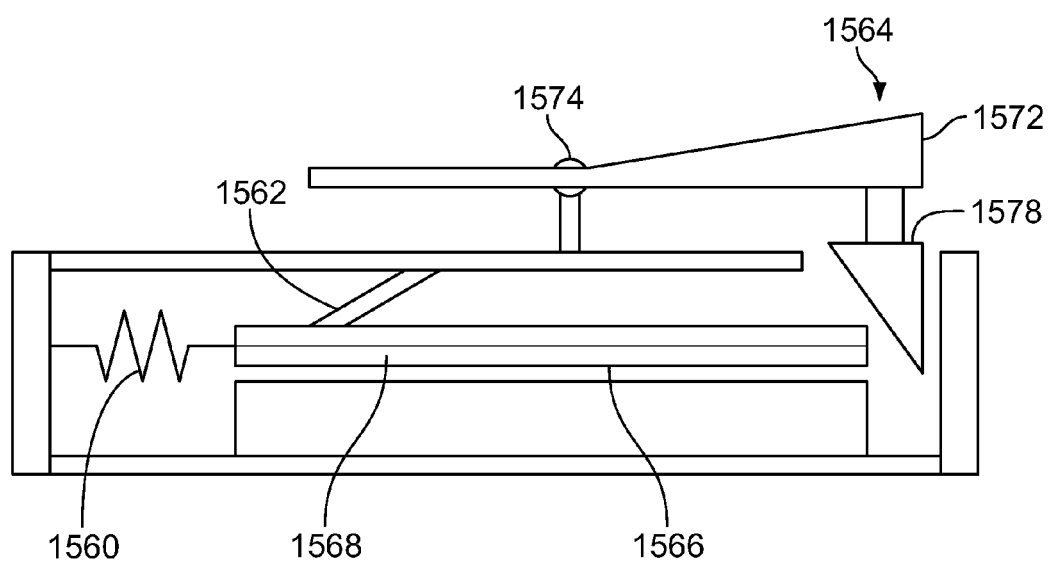

In the example shown in FIG. 15D, preloaded spring 1560 oscillates back to a preloaded position and is caught by catch mechanism 1562, which has returned to its original position. Proof mass 1566 with multilayer circuit board 1568 are again ready to be actuated by an impulse provided by switch relative 1564. Switch 1564, when activated, moves beam 1572 and pusher 1578, by pivoting spring loaded pivot 1574.

Figure 16A:
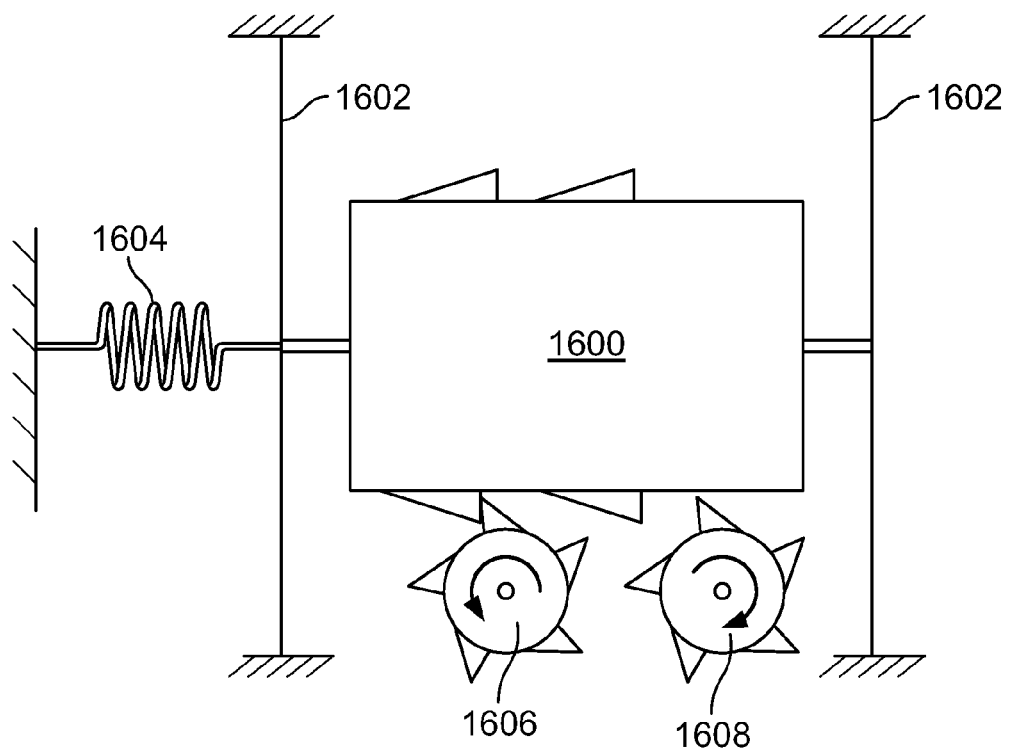
FIGS. 16A and 16B are block diagrams illustrating embodiments of a preloaded rotary switch.
Figure 16B:
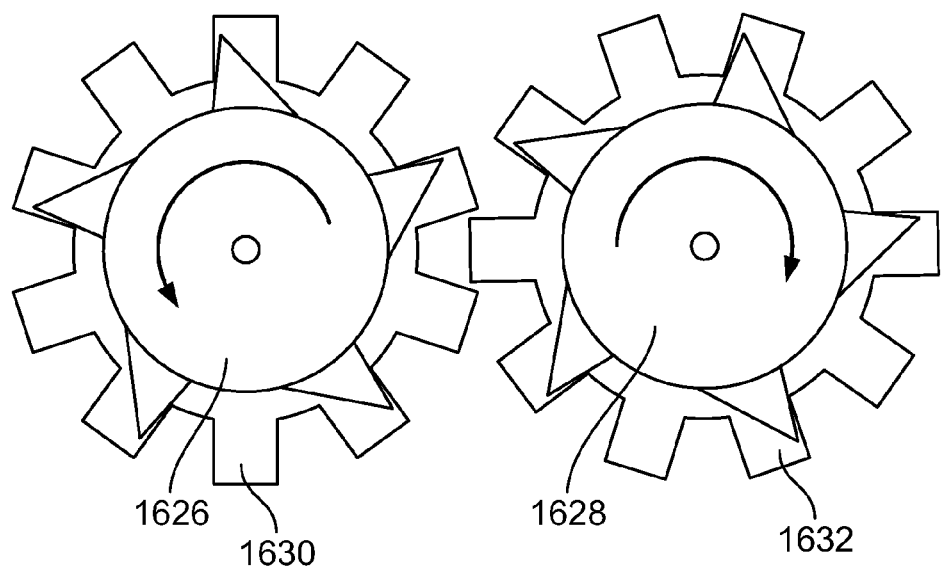

FIGS. 16A and 16B are block diagrams illustrating embodiments of a preloaded rotary switch. In the example shown in FIG. 16A, proof mass 1600 is suspended using soft springs 1602. Proof mass 1600 is coupled to stiff preloaded spring 1604. Wheel 1606 is a ratcheting wheel used to actuate and re-catch proof mass 1600. Wheel 1608 is pushed by proof mass 1600 and through gearing this push is used to index wheel 1606 positioning wheel 1606 to catch proof mass 1600 upon its return.

In the example shown in 16B, a user turns wheel 1626 counter clockwise, which further compresses a stiff preloaded spring (e.g., stiff preloaded spring 1604) and then releases a proof mass (e.g., proof mass 1600, which is configured to make a relative movement between a multilayer circuit board and a mulitpole magnet and thereby generate a current). Proof mass 1600 is then pushed to the right by stiff preloaded spring 1604. Near the end of its travel to the right, proof mass 1600 contacts and pushes on a mating tooth of wheel 1608. This slightly rotates wheel 1608. Because the two wheels are connected by a gear mechanism (e.g., gear 1630 and gear 1632), the rotation of wheel 1628 or 1608 also turns, or indexes, wheel 1606 or 1626 such that proof mass 1600 will re-catch on wheel 1606 or 1626 upon its return when being drawn back by stiff preloaded spring 1604.

Figure 17:
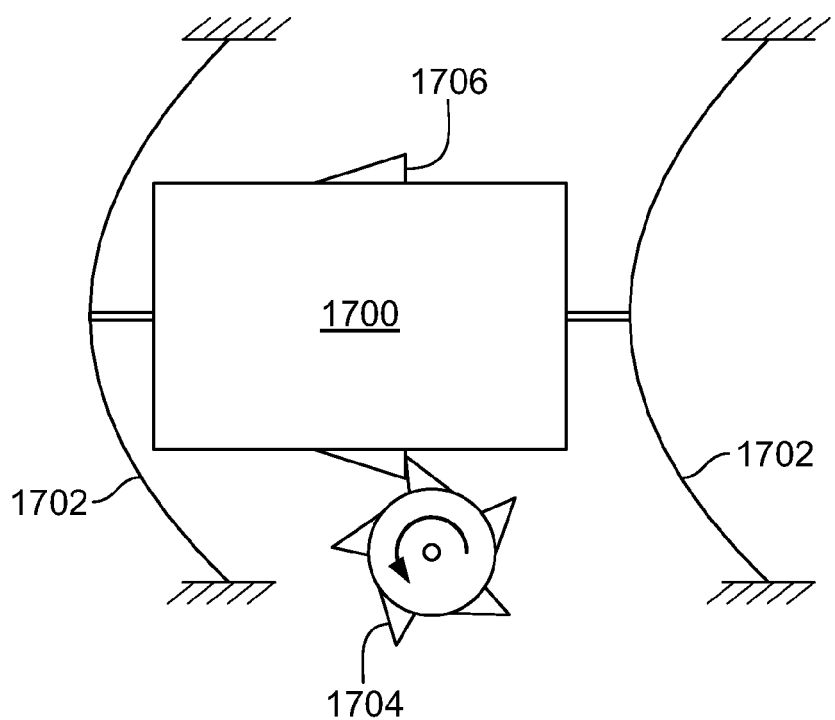
FIG. 17 is a block diagram illustrating an embodiment of a preloaded rotary switch.

FIG. 17 is a block diagram illustrating an embodiment of a preloaded rotary switch. In the example shown, proof mass 1700 is preloaded with long springs 1702. A rotary switch rotates wheel 1704. Wheel 1704 engages feature 1706 to provide an impulse to proof mass 1700. Wheel 1704 has a ratcheting mechanism so that it can only rotate counter-clockwise. Proof mass 1700 is caught on the way back by wheel 1704. Proof mass 1700 motion enables relative movement between a circuit board and a multipole magnet.

Figure 18A:
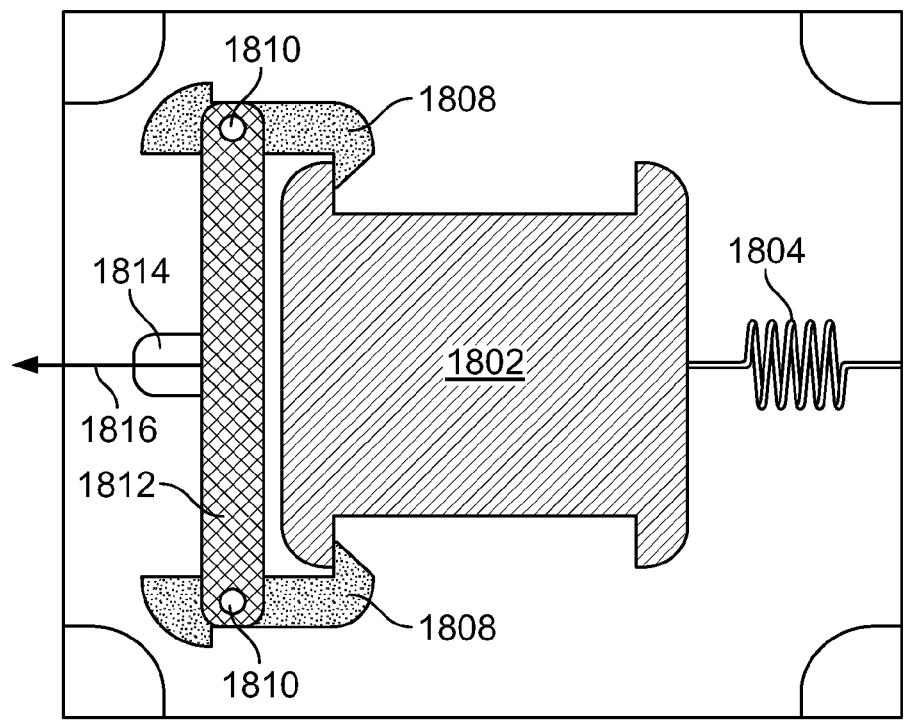
FIG. 18A is a block diagram illustrating an embodiment of a catch and release mechanism.

FIG. 18A is a block diagram illustrating an embodiment of a catch and release mechanism. In the example shown, proof mass 1802 is in its neutral position such that spring 1804 in neither extended nor compressed. Catch arms 1808 are engage proof mass 1802 and are held in position by spring loaded pin joints 1810. Catch arms 1808 are connected to each other via slider arm 1812. The movement of slider arm 1812 is controlled by guide 1814 in the base of the part. The user, or some switch mechanism, pulls on slider arm 1812 in the direction shown by arrow 1816 which pulls the proof mass in that direction.

Figure 18B:
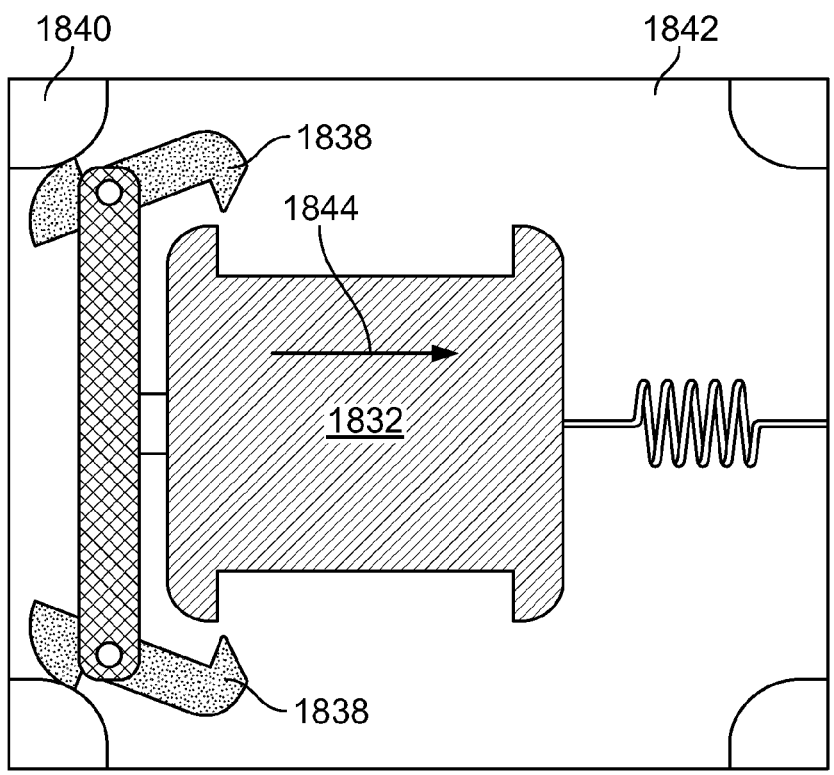
FIG. 18B is a block diagram illustrating an embodiment of a catch and release mechanism.

FIG. 18B is a block diagram illustrating an embodiment of a catch and release mechanism. In the example shown, proof mass 1832 is in the position of maximum displacement. It has been pulled to the left by catch arms 1838. Catch arms 1838 have been rotated by contact with interference features 1840 which are connected to base 1842 of the part. Catch arms 1838 have been rotated far enough that proof mass 1832 has been released, and will begin to move to the right as indicated by arrow 1844.

Figure 18C:
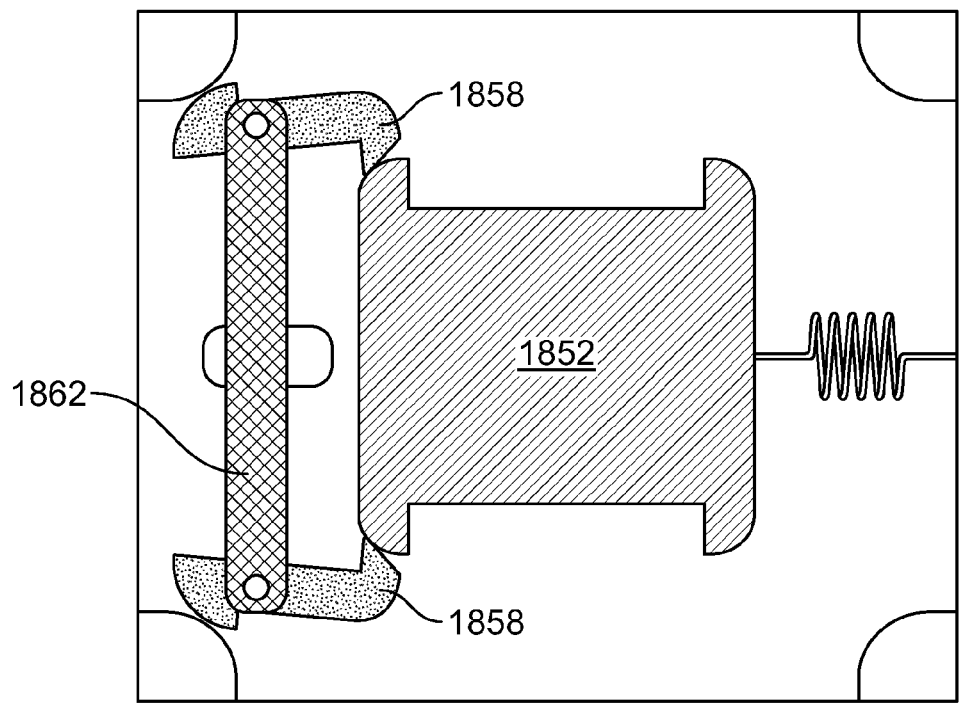
FIG. 18C is a block diagram illustrating an embodiment of a catch and release mechanism.

FIG. 18C is a block diagram illustrating an embodiment of a catch and release mechanism. As show in the figure, proof mass 1852 is in its neutral position having been release having oscillated down to a stationary position. Slider arm 1862 is moving toward proof mass 1852. Catch arms 1858 have come into contact with proof mass 1852 which has forced them to rotate outwards. As slider arm 1862 moves farther toward proof mass 1852, catch arms 1858 will snap into place locking on proof mass 1852 as shown in FIG. 18A.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A wireless switch comprising:
a mechanical oscillator;
a mechanical impulse deliverer, wherein the mechanical impulse deliverer delivers a mechanical impulse to the mechanical oscillator;
a first array of magnets positioned on a planar surface, wherein the first array comprises an array of magnets, wherein one magnet is in direct contact with another magnet; and
a first conductor,
wherein the first conductor offers an area to a magnetic flux that results in a generation of power in the event that there is relative motion between the first conductor(s) and the array of magnets;

wherein the first conductor includes two conductors wired in series each being in parallel with each other on a single layer of a multilayer printed circuit board; and wherein the two conductors are arranged in a serpentine pattern including a plurality of right angle turns.

2. A wireless switch as in claim 1, wherein the first array of magnets comprises a sheet magnet with alternating poles in one dimension or two dimensions.

3. A wireless switch as in claim 1, wherein the first conductor comprises a plurality of serpentines on a single layer of a multilayer printed circuit board.

4. A wireless switch as in claim 1, further comprising a second conductor, wherein the second conductor comprises a second serpentine conductor, and wherein the first conductor and the second conductor are on opposite sides of the first array of magnets.

5. A wireless switch as in claim 1, further comprising a second array of magnets, and wherein the first array of magnets and the second array of magnets are on opposite sides of the first conductor.

6. A wireless switch as in claim 1, wherein the relative motion comprises motion parallel to the planar surface.

7. A wireless switch as in claim 1, wherein the relative motion comprises motion perpendicular to the planar surface.

8. A wireless switch as in claim 1, wherein the mechanical oscillator is preloaded.

9. A wireless switch as in claim 6, wherein the preloading uses a spring or a flexure mechanism.

10. A wireless switch as in claim 9, wherein a mechanical impulse deliverer further loads the spring or the flexure mechanism and causes a release of a proof mass of the mechanical oscillator.

11. A wireless switch as in claim 10, wherein the mechanical impulse deliverer comprises one of the following: a rotary dial, a lever, a push button, or a toggle switch.

12. A wireless switch as in claim 9, wherein a catch or a ratchet catches the proof mass such that the spring or the flexure mechanism is preloaded again after one or more oscillations of the mechanical oscillator.

13. A method of wireless switching comprising:
providing DC power as a result of relative motion due to a mechanical oscillator between a first array of magnets and a first conductor,
wherein one magnet is in direct contact with another magnet;
wherein the mechanical oscillator oscillates as a result of a mechanical impulse delivered from switching a wireless switch;
wherein the first conductor includes two conductors wired in series each being in parallel with each other on a single layer of a multilayer printed circuit board; and
wherein the two conductors are arranged in a serpentine pattern including a plurality of right angle turns.

14. A method as in claim 13, wherein the first array of magnets comprises a sheet magnet with alternating poles in one dimension or two dimensions.

15. A method as in claim 13, wherein the first conductor comprises a plurality of serpentines on a single layer of a multilayer printed circuit board.

16. A method as in claim 13, further comprising a second conductor, wherein the second conductor comprises a second serpentine conductor, and wherein the first conductor and the second conductor are on opposite sides of the first array of magnets.

17. A method as in claim 13, further comprising a second array of magnets, wherein the first array of magnets and the second array of magnets are on opposite sides of the first conductor.

18. A method as in claim 13, wherein the relative motion comprises motion parallel to the planar surface.

19. A method as in claim 13, wherein the relative motion comprises motion perpendicular to the planar surface.

20. A method as in claim 13, wherein the mechanical oscillator is preloaded.

21. A method as in claim 18, wherein the preloading uses a spring or a flexure mechanism.

22. A method as in claim 21, wherein a mechanical impulse deliverer further loads the spring or the flexure mechanism and causes a release of a proof mass of the mechanical oscillator.

23. A method as in claim 22, wherein the mechanical impulse deliverer comprises one of the following: a rotary dial, a lever, a push button, or a toggle switch.

24. A method as in claim 21, wherein a catch or a ratchet catches the proof mass such that the spring or the flexure mechanism is preloaded again after one or more oscillations of the mechanical oscillator.

* * * * *